United States Patent
Ferdinand et al.

(10) Patent No.: US 12,218,871 B2
(45) Date of Patent: *Feb. 4, 2025

(54) SYSTEM AND METHOD FOR GENERATING REFERENCE SIGNAL WITH LOW PEAK AVERAGE POWER RATIO

(71) Applicants: Nuwan Suresh Ferdinand, Kanata (CA); Ming Jia, Kanata (CA); Jianglei Ma, Kanata (CA); Javad Abdoli, Kanata (CA)

(72) Inventors: Nuwan Suresh Ferdinand, Kanata (CA); Ming Jia, Kanata (CA); Jianglei Ma, Kanata (CA); Javad Abdoli, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/324,239

(22) Filed: May 26, 2023

(65) Prior Publication Data

US 2023/0318775 A1 Oct. 5, 2023

Related U.S. Application Data

(63) Continuation of application No. 17/064,098, filed on Oct. 6, 2020, now Pat. No. 11,706,002.

(51) Int. Cl.
*H04L 5/00* (2006.01)
*H04L 25/02* (2006.01)
*H04L 27/10* (2006.01)

(52) U.S. Cl.
CPC ........ *H04L 5/0048* (2013.01); *H04L 25/0202* (2013.01); *H04L 27/10* (2013.01)

(58) Field of Classification Search
CPC ... H04L 5/0048; H04L 25/0202; H04L 27/10; H04L 27/2626; H04L 27/2613; H04J 13/0003; H04J 13/0059
See application file for complete search history.

(56) References Cited

U.S. PATENT DOCUMENTS

| | | |
|---|---|---|
| 2003/0185313 A1 | 10/2003 | Beaulieu |
| 2010/0067591 A1 | 3/2010 | Luo et al. |
| | (Continued) | |

FOREIGN PATENT DOCUMENTS

| | | |
|---|---|---|
| CN | 111526106 A | 8/2020 |
| WO | 2019083426 A1 | 5/2019 |

OTHER PUBLICATIONS

Qualcomm Incorporated, "Lower PAPR reference signals", 3GPP TSG RAN WG1 Ad-Hoc Meeting 1901, R1-1901317, Taipei, Taiwan, Jan. 21-25, 2019, 25 pages.

(Continued)

*Primary Examiner* — Dady Chery

(57) ABSTRACT

A reference signaling scheme is provided that is based on the use of a Zadoff Chu sequence with cyclic repetition, optionally code division multiplexing precoding, together with frequency domain spectral shaping (FDSS). A specific pulse shape design for the FDSS part of the reference signal scheme in some embodiments involves the use of a raised cosine pulse raised to the power of $\beta$. The new solution for generating reference signals has a Low peak average power ratio that matches the PAPR of SC-OQAM, good channel estimation performance, and the ability to implement CDM in the frequency domain to increase multiplexing gain.

22 Claims, 18 Drawing Sheets

(56) References Cited

U.S. PATENT DOCUMENTS

2010/0086082 A1\* 4/2010 Ogawa ............... H04L 27/2626
 375/308
2018/0241603 A1 8/2018 Jia et al.
2021/0176104 A1\* 6/2021 Yang ................... H04L 27/2634

OTHER PUBLICATIONS

"5G; NR; Physical channels and modulation", 3GPP TS 38.211 version 16.2.0 Release 16, ETSI TS 138 211 V16.2.0 (Jul. 2020), 136 pages.
Qualcomm Incorporated et al.,"Lower PAPR reference signals",3GPP TSG RAN WG1 Meeting #94bis Chengdu, China, Oct. 8-12, 2018, R1-1811941, 16 pages.
Huawei, HiSilicon et al.,"Initial access signal and channels in NR unlicensed band",3GPP TSG RAN WG1 Meeting #97 Reno, USA, May 13-17, 2019, R1-1906041, 13 pages.
Motorola,"Uplink Reference Signal Generation Methods",3GPP RAN WG1 #47bis Sorrento, Italy Jan. 15-19, 2007,R1-070152,total:8pages.
Huawei, HiSilicon,"UL channels and signals in NR unlicensed band",3GPP TSG RAN WG1 Meeting #99 Reno, USA, Nov. 18-22, 2019,R1-1911865,total:12pages.

\* cited by examiner

FIG. 3A Subcarrier index (1 of 12) for two CDM groups

FIG. 3B Subcarrier index (1 of 12) for three CDM groups

SYSTEM AND METHOD FOR GENERATING REFERENCE SIGNAL WITH LOW PEAK AVERAGE POWER RATIO

CROSS REFERENCE TO RELATED APPLICATION

The present application is a continuation of U.S. patent application Ser. No. 17/064,098, filed Oct. 6, 2020, the contents of which are hereby incorporated herein by reference.

FIELD

The application relates to wireless communications generally, and more specifically to systems and methods for generating reference signals for use in wireless communications systems.

BACKGROUND

In some wireless communication systems, user equipments (UEs) wirelessly communicate with one or more base stations. A wireless communication from a UE to a base station is referred to as an uplink communication. A wireless communication from a base station to a UE is referred to as a downlink communication. Resources are required to perform uplink and downlink communications. For example, a base station may wirelessly transmit data to a UE in a downlink communication at a particular frequency for a particular duration of time. The frequency and time duration are examples of resources, typically referred to as "time-frequency resources".

Two devices that wirelessly communicate with each other over time-frequency resources need not necessarily be a UE and a base station. For example, two UEs may wirelessly communicate with each other over a sidelink using device-to-device (D2D) communication. As another example, two network devices (e.g. a terrestrial base station and a non-terrestrial base station, such as a drone) may wirelessly communicate with each other over a backhaul link.

When wireless communication occurs between two devices, the device performing the transmitting will be referred to as the transmitting device, and the device performing the receiving will be referred to as the receiving device. A single device might be both a transmitting device and a receiving device, e.g. if the single device performs transmission and reception. An example of a device may be a UE, a base station, or another network device. When a UE and base station are communicating with each other, during an uplink transmission the UE is the transmitting device and the base station is the receiving device, and during a downlink transmission the UE is the receiving device and the base station is the transmitting device.

When two devices wirelessly communicate with each other, a reference sequence may be transmitted over the wireless channel from the transmitting device to the receiving device. The reference sequence may be used by the receiving device to perform channel estimation. The reference sequence has values known in advance by the receiving device. The receiving device uses the received reference sequence to perform channel estimation for the channel over which the reference sequence was received. The channel estimation may then be used by the receiving device for decoding information (e.g. control information and/or data) received from the transmitting device on that channel.

There are two parts in the design of reference signaling scheme. The first part concerns the selection or design of the reference signaling sequence and the second part concerns how to multiplex the reference signal with data and allocate subcarriers. When designing reference signals, a number of key design parameters are important. These are summarized below.

Good autocorrelation property or flat frequency response: Autocorrelation of the sequence determines how flat the frequency response of the sequence is. If the frequency response is not flat, then channel estimation performance is impacted. Thus, a sequence that has flat frequency response is desired.

Low cross correlation property: Cross correlation is a measure of the correlation between different sequences. Low cross correlation is desired as it enables multiplexing of sequences by different user equipments (UEs) or different antenna ports while still retaining near orthogonally.

Low peak average power ratio (PAPR) property: low PAPR is desirable in some circumstances, for example, when a low PAPR waveform is used for data transmission.

Reference signal design typically depends on the type of waveform which is used for data transmission. In orthogonal frequency division multiplexing (OFDM), the low PAPR property of the reference signal is not critical because OFDM itself in not a low-PAPR waveform, and therefore, pseudo noise (PN) sequences are typically used. The PN sequences have good auto and cross correlation properties. For a low-PAPR waveform, such as discrete Fourier transform-spread-OFDM (DFT-s-OFDM), all of the above mentioned properties for the reference signal are important, and thus Zadoff Chu (ZC) sequences are used, which have lower PAPR in comparison to PN sequences.

In general, the PAPR of a transmission is determined by both PAPR of the reference signal and PAPR of the underlying data waveform. Therefore, for a low-PAPR transmission, both reference signal and data waveform should have low PAPR, and in particular, PAPR of the reference signal should be comparable with that of the data waveform. As an example of a low-PAPR waveform, using frequency domain spectral shaping (FDSS) T/2-binary phase shift keying (BPSK) together with DFT spreading (FDSS T$t$/2-BPSK DFT-s-OFDM, which is a special case of single carrier-offset QAM (SC-OQAM) introduced below) provides a waveform that has lower PAPR than original DFT-S-OFDM. For this type of waveform, the reference signal should have lower PAPR than reference signals which are typically used with original DFT-S-OFDM, such that PAPR of the reference signal is comparable with that of the FDSS T$t$/2-BPSK DFT-S-OFDM. There are few approaches have been considered for FDSS T$t$/2-BPSK in the literature.

In one approach, PN or ZC sequence are used together with FDSS: these sequences have higher PAPR than the data waveform and thus these are not suitable. Even with frequency domain spectral shaping of the reference signal, the PAPR is still significantly higher.

Another approach is to use a FDSS based $\pi/2$-BPSK sequence: these sequences have the same PAPR as $\pi/2$-BPSK data symbols and have been adopted in 3GPP standards. However, these sequences are non-flat in frequency domain, resulting in poor channel estimation performance. Also, these approaches do not offer a suitable way to implement code domain multiplexing (CDM) in the frequency domain, and thus there is a loss of multiplexing gain.

Some approaches were proposed recently to implement CDM. However, these approaches lead to poor block error rate (BLER) performance. Therefore, in New Radio (NR), only two antenna ports are supported (only frequency division multiplexing (FDM), losing half of the multiplexing gain.

SUMMARY

A reference signaling scheme is provided that is based on the use of a Zadoff Chu sequence with cyclic repetition, optionally code division multiplexing precoding, together with frequency domain spectral shaping (FDSS). A specific pulse shape design for the FDSS part of the reference signal scheme in some embodiments involves the use of a raised cosine pulse raised to the power of β. The new solution for generating reference signals has a Low peak average power ratio that matches the PAPR of SC-OQAM, good channel estimation performance, and the ability to implement CDM in the frequency domain to increase multiplexing gain.

In the description below, the focus is on transmission of reference signals in the uplink. However, it should be understood that reference signals having the same format can be transmitted in other contexts. To name a few examples, the references signals can be used for downlink transmission, sidelink transmission, transmission from transmission receive points (TRPs) of any type, such as terrestrial TRPs including base stations, eNB, non-terrestrial TRPs including satellite, drone, and other terrestrial nodes; phones, V2x devices, sensors, and wearable devices.

According to one aspect of the present disclosure, there is provided a method comprising: receiving, by an apparatus from a network device, a first signaling indicating a length K sequence; transmitting, by the apparatus to the network device a reference signal; wherein the reference signal is obtained from the length K sequence, and the length K sequence is obtained by cyclicly repeated a length p ZC sequence, where p is a prime number larger than K/2.

Optionally, the reference signal is obtained from the length K sequence by: applying, by the apparatus, pre-coding to the length K sequence to produce a pre-coded sequence; generating, by the apparatus, a first pulse shaped frequency domain sequence by applied a first frequency domain spectral shaping to the pre-coded sequence.

Optionally, the first frequency domain spectral shaping is a preconfigured FDSS pulse shape or an FDSS pulse shape indicated in a second signalling from the network device.

Optionally, the first pulse shaped frequency domain sequence is generated by applying a raised cosine pulse raised to a power of β≥0.5, or β=0.8.

Optionally, applying pre-coding to the length K sequence to produce a pre-coded sequence comprises: multiplying the length K sequence by an orthogonal cover code.

Optionally, the reference signal is obtained from the length K sequence by: producing a mapped sequence by mapping the first pulse shaped frequency domain sequence to a first subset of a set of subcarriers.

Optionally, the orthogonal cover code is one of a set of orthogonal cover codes associated with the first subset of the set of subcarriers.

Optionally, the method further comprises: performing data signal generation comprising applying second frequency domain spectral shaping to produce a second pulse shaped frequency domain sequence.

Optionally, applying first frequency domain spectral shaping comprises applying a first pulse shape; applying second frequency domain spectral shaping also comprises applying the first pulse shape.

Optionally, applying first frequency domain spectral shaping comprises applying a first pulse shape; applying second frequency domain spectral shaping comprises applying a second pulse shape that is different from the first pulse shape.

According to another aspect of the present disclosure, there is provided a method comprising: transmitting, by a network device to an apparatus, a first signaling indicating a length K sequence; receiving, by the network device from the apparatus a reference signal; wherein the reference signal is obtained from the length K sequence, and the length K sequence is obtained by cyclicly repeated a length p ZC sequence, where p is a prime number larger than K/2.

Optionally, the reference signal is based on a first frequency domain spectral shaping performed by the apparatus using a first frequency domain spectral shaping pulse shape unknown to the network device, the method further comprising: performing channel estimation to produce a channel estimate that includes the effect of the first frequency domain pulse shape.

Optionally, the method further comprises: transmitting signalling to indicate a first frequency domain spectral shaping pulse shape to be used by the apparatus to generate the reference signal; wherein the reference signal is based on a first frequency domain spectral shaping performed by the apparatus using the first frequency domain pulse shape known to the network device.

Optionally, the method further comprises: processing the received reference signal by applying a frequency domain spectral shaping pulse shape corresponding to the first frequency domain pulse shape to remove the effect of the first frequency domain spectral shaping; performing channel estimation based on an output of the frequency domain spectral shaping.

According to another aspect of the present disclosure, there is provided an apparatus comprising: a processor and memory, the apparatus configured to: receive, by the apparatus from a network device, a first signaling indicating a length K sequence; transmit, by the apparatus to the network device a reference signal; wherein the reference signal is obtained from the length K sequence, and the length K sequence is obtained by cyclicly repeated a length p ZC sequence, where p is a prime number larger than K/2.

Optionally, the apparatus is configured to obtain the reference signal is obtained from the length K sequence by: applying, by the apparatus, pre-coding to the length K sequence to produce a pre-coded sequence; generating, by the apparatus, a first pulse shaped frequency domain sequence by applied a first frequency domain spectral shaping to the pre-coded sequence.

Optionally, the first frequency domain spectral shaping is a preconfigured FDSS pulse shape or an FDSS pulse shape indicated in a second signalling from the network device.

Optionally, the apparatus is configured to apply pre-coding to the length K sequence to produce a pre-coded sequence by: multiplying the length K sequence by an orthogonal cover code.

Optionally, the apparatus is further configured to: perform data signal generation comprising applying second frequency domain spectral shaping to produce a second pulse shaped frequency domain sequence.

Optionally, the apparatus is configured to apply the first frequency domain spectral shaping by applying a first pulse shape and to apply the second frequency domain spectral shaping by also applying the first pulse shape.

Optionally, the apparatus is configured to apply the first frequency domain spectral shaping by applying a first pulse shape and to apply the second frequency domain spectral shaping by applying a second pulse shape different from the first pulse shape.

According to another aspect of the present disclosure, there is provided a network device comprising: processor and memory, the network device configured to: transmit, by a network device to an apparatus, a first signaling indicating a length K sequence; receive, by the network device from the apparatus a reference signal; wherein the reference signal is obtained from the length K sequence, and the length K sequence is obtained by cyclicly repeated a length p ZC sequence, where p is a prime number larger than K/2.

Optionally, the reference signal is based on a first frequency domain spectral shaping performed by the apparatus using a first frequency domain spectral shaping pulse shape unknown to the network device, the network device further configured to: performing channel estimation to produce a channel estimate that includes the effect of the first frequency domain pulse shape.

Optionally, the network device is further configured to: transmit signalling to indicate a first frequency domain spectral shaping pulse shape to be used by the apparatus to generate the reference signal; wherein the reference signal is based on a first frequency domain spectral shaping performed by the apparatus using the first frequency domain pulse shape known to the network device.

Optionally, the network device is further configured to: process the received reference signal by applying a frequency domain spectral shaping pulse shape corresponding to the first frequency domain pulse shape to remove the effect of the first frequency domain spectral shaping; perform channel estimation based on an output of the frequency domain spectral shaping.

According to another aspect of the present disclosure, there is provided a method comprising: transmitting, by a network device to an apparatus, a first signaling indicating a length K sequence; transmitting, by the network device to the apparatus a reference signal; wherein the reference signal is obtained from the length K sequence, and the length K sequence is obtained by cyclicly repeated a length p ZC sequence, where p is a prime number larger than K/2.

Optionally, the reference signal is obtained from the length K sequence by: applying, by the network device, pre-coding to the length K sequence to produce a pre-coded sequence; generating, by the network device, a first pulse shaped frequency domain sequence by applied a first frequency domain spectral shaping to the pre-coded sequence.

Optionally, the first frequency domain spectral shaping is a preconfigured FDSS pulse shape or an FDSS pulse shape indicated in a second signalling from the network device.

Optionally, the first pulse shaped frequency domain sequence is generated by applying a raised cosine pulse raised to a power of $\beta \geq 0.5$, or $\beta = 0.8$.

Optionally, applying pre-coding to the length K sequence to produce a pre-coded sequence comprises: multiplying the length K sequence by an orthogonal cover code.

Optionally, the reference signal is obtained from the length K sequence by: producing a mapped sequence by mapping the first pulse shaped frequency domain sequence to a first subset of a set of subcarriers.

Optionally, the orthogonal cover code is one of a set of orthogonal cover codes associated with the first subset of the set of subcarriers.

Optionally, the method further comprises: performing data signal generation comprising applying second frequency domain spectral shaping to produce a second pulse shaped frequency domain sequence.

Optionally, applying first frequency domain spectral shaping comprises applying a first pulse shape; applying second frequency domain spectral shaping also comprises applying the first pulse shape.

Optionally, applying first frequency domain spectral shaping comprises applying a first pulse shape; applying second frequency domain spectral shaping comprises applying a second pulse shape that is different from the first pulse shape.

According to another aspect of the present disclosure, there is provided a method comprising: receiving, by an apparatus from a network device, a first signaling indicating a length K sequence; receiving, by the apparatus from the network device a reference signal; wherein the reference signal is obtained from the length K sequence, and the length K sequence is obtained by cyclicly repeated a length p ZC sequence, where p is a prime number larger than K/2.

Optionally, the reference signal is based on a first frequency domain spectral shaping performed by the apparatus using a first frequency domain spectral shaping pulse shape unknown to the network device, the method further comprising: performing, by the apparatus, channel estimation to produce a channel estimate that includes the effect of the first frequency domain pulse shape.

Optionally, the method further comprises: receiving signalling to indicate a first frequency domain spectral shaping pulse shape to be used by the apparatus to generate the reference signal; wherein the reference signal is based on a first frequency domain spectral shaping performed by the apparatus using the first frequency domain pulse shape known to the network device.

Optionally, the method further comprises: processing the received reference signal by applying a frequency domain spectral shaping pulse shape corresponding to the first frequency domain pulse shape to remove the effect of the first frequency domain spectral shaping; performing channel estimation based on an output of the frequency domain spectral shaping.

According to another aspect of the present disclosure, there is provided a network device comprising: a processor and memory, the network device configured to: transmit, by the network device to an apparatus, a first signaling indicating a length K sequence; transmit, by the network device to the apparatus device a reference signal; wherein the reference signal is obtained from the length K sequence, and the length K sequence is obtained by cyclicly repeated a length p ZC sequence, where p is a prime number larger than K/2.

Optionally, the apparatus is configured to obtain the reference signal is obtained from the length K sequence by: applying, by the apparatus, pre-coding to the length K sequence to produce a pre-coded sequence; generating, by the apparatus, a first pulse shaped frequency domain sequence by applied a first frequency domain spectral shaping to the pre-coded sequence.

Optionally, the first frequency domain spectral shaping is a preconfigured FDSS pulse shape or an FDSS pulse shape indicated in a second signalling from the network device.

Optionally, the apparatus is configured to apply pre-coding to the length K sequence to produce a pre-coded sequence by: multiplying the length K sequence by an orthogonal cover code.

Optionally, the network device is further configured to: perform data signal generation comprising applying second frequency domain spectral shaping to produce a second pulse shaped frequency domain sequence.

Optionally, the network device is configured to apply the first frequency domain spectral shaping by applying a first pulse shape and to apply the second frequency domain spectral shaping by also applying the first pulse shape.

Optionally, the network device is configured to apply the first frequency domain spectral shaping by applying a first pulse shape and to apply the second frequency domain spectral shaping by applying a second pulse shape different from the first pulse shape.

According to another aspect of the present disclosure, there is provided an apparatus comprising: a processor and memory, the apparatus configured to: receive, by the apparatus from the network device, a first signaling indicating a length K sequence; receive, by the apparatus from the network device a reference signal; wherein the reference signal is obtained from the length K sequence, and the length K sequence is obtained by cyclicly repeated a length p ZC sequence, where p is a prime number larger than K/2.

Optionally, the reference signal is based on a first frequency domain spectral shaping performed by the apparatus using a first frequency domain spectral shaping pulse shape unknown to the network device, the apparatus further configured to: performing channel estimation to produce a channel estimate that includes the effect of the first frequency domain pulse shape.

Optionally, the apparatus is further configured to: receive signalling to indicate a first frequency domain spectral shaping pulse shape to be used by the apparatus to generate the reference signal; wherein the reference signal is based on a first frequency domain spectral shaping performed by the apparatus using the first frequency domain pulse shape known to the network device.

Optionally, the apparatus is further configured to: process the received reference signal by applying a frequency domain spectral shaping pulse shape corresponding to the first frequency domain pulse shape to remove the effect of the first frequency domain spectral shaping; perform channel estimation based on an output of the frequency domain spectral shaping.

According to another aspect of the present disclosure, there is provided a method comprising: receiving, by an apparatus from a network device or another apparatus, a first signaling indicating a length K sequence; transmitting, by the apparatus to the another apparatus a sidelink transmission comprising a reference signal; wherein the reference signal is obtained from the length K sequence, and the length K sequence is obtained by cyclicly repeated a length p ZC sequence, where p is a prime number larger than K/2.

Optionally, the reference signal is obtained from the length K sequence by: applying, by the apparatus, pre-coding to the length K sequence to produce a pre-coded sequence; generating, by the apparatus, a first pulse shaped frequency domain sequence by applied a first frequency domain spectral shaping to the pre-coded sequence.

Optionally, the first frequency domain spectral shaping is a preconfigured FDSS pulse shape or an FDSS pulse shape indicated in a second signalling from the network device or the other apparatus.

Optionally, the first pulse shaped frequency domain sequence is generated by applying a raised cosine pulse raised to a power of β≥0.5, or β=0.8.

Optionally, applying pre-coding to the length K sequence to produce a pre-coded sequence comprises: multiplying the length K sequence by an orthogonal cover code.

Optionally, the reference signal is obtained from the length K sequence by: producing a mapped sequence by mapping the first pulse shaped frequency domain sequence to a first subset of a set of subcarriers.

Optionally, the orthogonal cover code is one of a set of orthogonal cover codes associated with the first subset of the set of subcarriers.

Optionally, the method further comprises: performing data signal generation comprising applying second frequency domain spectral shaping to produce a second pulse shaped frequency domain sequence.

Optionally, applying first frequency domain spectral shaping comprises applying a first pulse shape; applying second frequency domain spectral shaping also comprises applying the first pulse shape.

Optionally, applying first frequency domain spectral shaping comprises applying a first pulse shape; applying second frequency domain spectral shaping comprises applying a second pulse shape that is different from the first pulse shape.

According to another aspect of the present disclosure, there is provided a method comprising: transmitting, w by an apparatus to another apparatus, a first signaling indicating a length K sequence; receiving, by the apparatus from the another apparatus, a sidelink transmission comprising a reference signal; wherein the reference signal is obtained from the length K sequence, and the length K sequence is obtained by cyclicly repeated a length p ZC sequence, where p is a prime number larger than K/2.

Optionally, the reference signal is based on a first frequency domain spectral shaping performed by the apparatus using a first frequency domain spectral shaping pulse shape unknown to the apparatus device, the method further comprising: performing channel estimation to produce a channel estimate that includes the effect of the first frequency domain pulse shape.

Optionally, the method further comprises: transmitting signalling to indicate a first frequency domain spectral shaping pulse shape to be used by the apparatus to generate the reference signal; wherein the reference signal is based on a first frequency domain spectral shaping performed by the apparatus using the first frequency domain pulse shape known to the apparatus.

Optionally, the method further comprises: processing the received reference signal by applying a frequency domain spectral shaping pulse shape corresponding to the first frequency domain pulse shape to remove the effect of the first frequency domain spectral shaping; performing channel estimation based on an output of the frequency domain spectral shaping.

According to another aspect of the present disclosure, there is provided an apparatus comprising: a processor and memory, the apparatus configured to: receive, by the apparatus from a network device or another apparatus, a first signaling indicating a length K sequence; transmit, by the apparatus to the another apparatus a sidelink transmission comprising a reference signal; wherein the reference signal is obtained from the length K sequence, and the length K sequence is obtained by cyclicly repeated a length p ZC sequence, where p is a prime number larger than K/2.

Optionally, the apparatus is configured to obtain the reference signal is obtained from the length K sequence by: applying, by the apparatus, pre-coding to the length K sequence to produce a pre-coded sequence; generating, by the apparatus, a first pulse shaped frequency domain sequence by applied a first frequency domain spectral shaping to the pre-coded sequence.

Optionally, the first frequency domain spectral shaping is a preconfigured FDSS pulse shape or an FDSS pulse shape indicated in a second signalling from the network device or the other apparatus.

Optionally, the apparatus is configured to apply pre-coding to the length K sequence to produce a pre-coded sequence by: multiplying the length K sequence by an orthogonal cover code.

Optionally, the apparatus is further configured to: perform data signal generation comprising applying second frequency domain spectral shaping to produce a second pulse shaped frequency domain sequence.

Optionally, the apparatus is configured to apply the first frequency domain spectral shaping by applying a first pulse shape and to apply the second frequency domain spectral shaping by also applying the first pulse shape.

Optionally, the apparatus is configured to apply the first frequency domain spectral shaping by applying a first pulse shape and to apply the second frequency domain spectral shaping by applying a second pulse shape different from the first pulse shape.

According to another aspect of the present disclosure, there is provided an apparatus comprising: a processor and memory, the apparatus configured to: transmit, by the apparatus to another apparatus, a first signaling indicating a length K sequence; receive, by the apparatus from the another apparatus a reference signal; wherein the reference signal is obtained from the length K sequence, and the length K sequence is obtained by cyclicly repeated a length p ZC sequence, where p is a prime number larger than K/2.

Optionally, the reference signal is based on a first frequency domain spectral shaping performed by the apparatus using a first frequency domain spectral shaping pulse shape unknown to the apparatus, the apparatus further configured to: performing channel estimation to produce a channel estimate that includes the effect of the first frequency domain pulse shape.

Optionally, the apparatus is further configured to: transmit signalling to indicate a first frequency domain spectral shaping pulse shape to be used by the apparatus to generate the reference signal; wherein the reference signal is based on a first frequency domain spectral shaping performed by the apparatus using the first frequency domain pulse shape known to the apparatus.

Optionally, the apparatus is further configured to: process the received reference signal by applying a frequency domain spectral shaping pulse shape corresponding to the first frequency domain pulse shape to remove the effect of the first frequency domain spectral shaping; perform channel estimation based on an output of the frequency domain spectral shaping.

BRIEF DESCRIPTION OF THE DRAWINGS

Embodiments of the disclosure will now be described with reference to the attached drawings in which:

FIGS. 3A, 3B, 4A and 4B depict reference signal multiplexing using frequency division multiplexing and code domain multiplexing;

DETAILED DESCRIPTION

The operation of the current example embodiments and the structure thereof are discussed in detail below. It should be appreciated, however, that the present disclosure provides many applicable inventive concepts that can be embodied in any of a wide variety of specific contexts. The specific embodiments discussed are merely illustrative of specific structures of the disclosure and ways to operate the disclosure, and do not limit the scope of the present disclosure.

Recently, a novel waveform referred to as single carrier-offset orthogonal quadrature amplitude modulation (SC-OQAM) has been proposed. See commonly assigned U.S. application Ser. No. 16/567,122 filed Sep. 11, 2019, hereby incorporated by reference in its entirety. A key feature of SC-OQAM is very low PAPR property while supporting higher modulation levels than BPSK. Currently, there is no reference signal which has a PAPR comparable with that of SC-OQAM and has other desired properties such as the ability to implement code division multiplexing.

The embodiments provided a new solution is based on a reference signaling scheme using a ZC sequence with cyclic repetition, optionally CDM precoding, together with FDSS pulse shaping. A specific pulse shape design for the FDSS part of the reference signal scheme in some embodiments involves the use of a raised cosine (RC) pulse raised to the power of β. The new solution for generating reference signals has the following properties:

a Low PAPR that matches the PAPR of SC-OQAM;
 good channel estimation performance;
 ability to implement CDM in frequency domain to increase multiplexing gain.

Reference Signal Generator

Figure 1A:
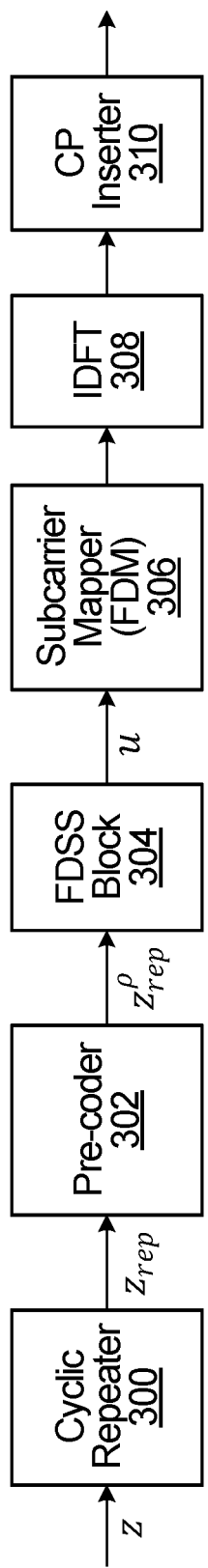
FIG. 1A is a block diagram of a system for generating a reference signal.

Referring now to FIG. 1A, shown is a block diagram of a reference signal generator. The block diagram includes, in sequence, a cyclic repeater 300, pre-coder 302, FDSS block 304, subcarrier mapper 306, inverse discrete Fourier transform (IDFT) 308, and cyclic prefix (CP) inserter 310. The operation of the blocks shown in FIG. 1A will now be described in detail. Let K be the number of subcarriers that are allocated for reference signal transmission. Let $J=J[k]$, $0 \leq k \leq K-1$ denote a set of indices of K subcarriers allocated for reference signal transmission that are placed within a bandwidth of M subcarriers $\{A+1, A+2, \ldots, A+M\}$, where $M \geq K$ and $A \geq 0$ is an offset. Let p be a prime number that is less than or equal to K. For best results, in some embodiments, p is close to K/2. and more specifically in some embodiments p is the smallest prime number larger than K/2. Then, based on p, a $q^{th}$ root ZC sequence z having length p is defined according to:

$$z(k) = e^{-\frac{i\pi q k(k+1)}{p}}, 0 \leq k \leq p-1$$

where a different q results in different ZC sequences. Different q may be assigned to different user equipments based on a rule. Typically, $0<q<p$.

The ZC sequence z defined above is input to the cyclic repeater 300. In the cyclic repeater 300, sequence z is cyclically repeated to a sequence $z_{rep}$ having length K:

$$z_{rep}(k) = z([k]_K) = e^{-\frac{i\pi q[k]_p([k]_p+1)}{p}}, 0 \leq k \leq K-1$$

where $[k]_K = k \mod K$ or remainder of k/K.

In the pre-coder 302, sequence $z_{rep}$ is multiplied with a pre-coder sequence of length p, where the kth element of the pre-coder output is given by $$z_{rep}^P(k) = z_{rep}(k)p(k), 0 \leq k \leq K-1$$

The pre-coding may represent a CDM operation; the pre-coder sequence may be an orthogonal cover code (OCC) such that $p(k) \in \{+1, -1\}$. In some embodiments, pre-coder 302 is omitted.

In the FDSS block 304, the sequence $z_{rep}^P$ is multiplied with K coefficients out of M coefficients defined by an FDSS pulse shape F having length M. The K coefficients out of M coefficients align with the K out of M subcarriers indexed by J. The output of FDSS is K length vector u, which is given by $$u = F(J-A) \odot z_{rep}^P$$

where $\odot$ is element by element multiplication and $J-A \subset \{1, \ldots, M\}$ are the K corresponding index set.

In the subcarrier mapper 306, this K length u sequence is mapped to subcarriers indexed by J. In the IDFT 308, an N-IDFT ($N \geq M$) is applied to the subcarrier mapped signal. In the CP inserter 310, a CP is inserted.

Figure 1B:
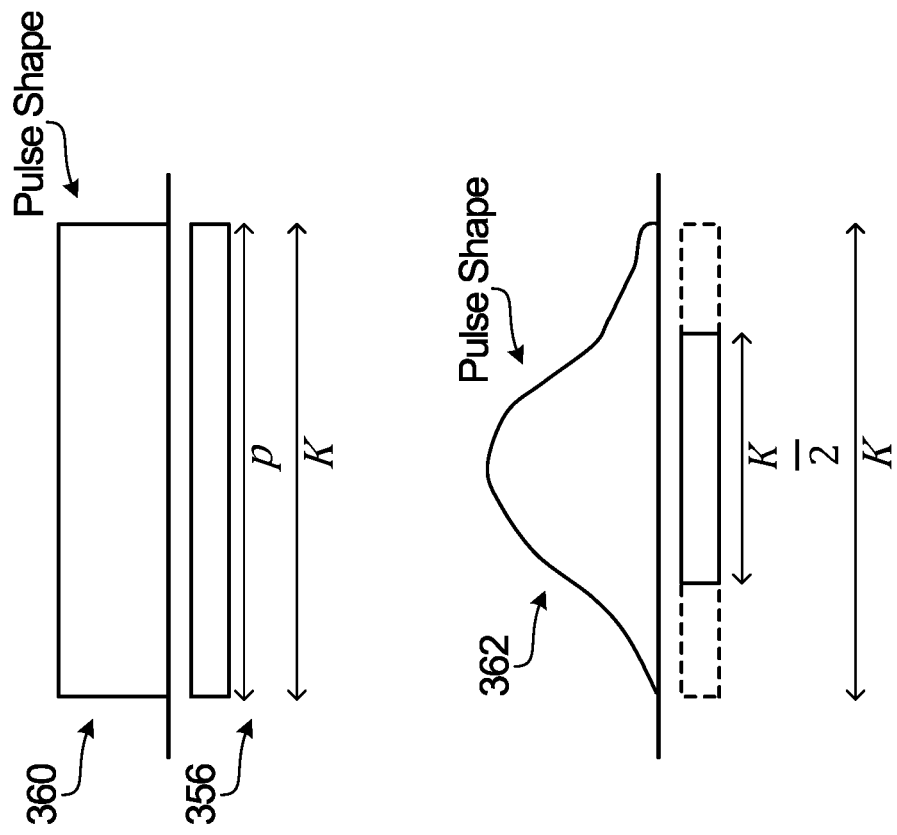
FIGS. 1B and 1C depict examples of the effect of the choice of the parameter p.

The generation of the sequence $z_{rep}$ will now be described in further detail with reference to FIGS. 1B and 1C. Recall that the length of reference signal sequence $z_{rep}$ is K and the this is multiplied by K. coefficients out of a length M. In order to generate $z_{rep}$, a $p \leq K$ length ZC sequence z is generated. This is depicted at 350 in FIG. 1B. Next, this p length z sequence is cyclicly repeated to obtain the K length $z_{rep}$ sequence 352.

The choice of the parameter p as the smallest prime number larger than K/2. has an effect on the result of cyclic repetition. More generally, p is a prime number larger than K/2. Otherwise, there will be more than one repetition.

In a first example, consider p=K, which means there is no repetition. This option is indicated at 356. In a second example, consider p=K/2, which there is one complete repetition. The entire sequence is repeated. This option is indicated at 358.

Next, FDSS that can be applied for this option will be described with reference to FIG. 1C. As there are no repetition for option 356 for p=K, the pulse shape has to be a rectangle 360 to retain all the information. In other words, a roll off factor $\alpha=0$ is used. As the pulse shape is rectangle, the PAPR will be higher.

Figure 1C:
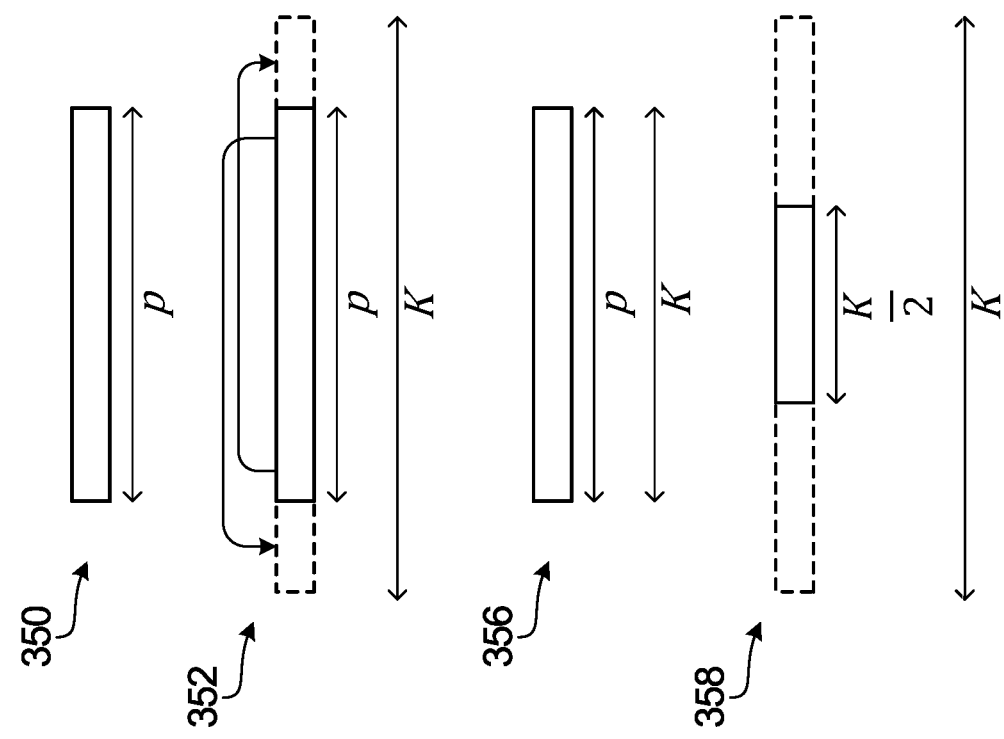

For the option 358 where p=K/2 an RC pulse with roll off factor $\alpha=1$ can be used as shown at 362 in FIG. 1C. The reason $\alpha=1$ can be used is because of presence of one full cyclic repetition. This will give the best PAPR.

Thus, solely from a PAPR standpoint, p=K/2 yields the best result, there is a further condition for ZC sequences that p has to be a prime number. Therefore, to satisfy this further condition and achieve the better PAPR is to use the smallest prime number larger than K/2. The closer p is to K/2, the better the PAPR. The PAPR can be minimized with the proper selection of roll off factor $\alpha$.

Figure 2A:
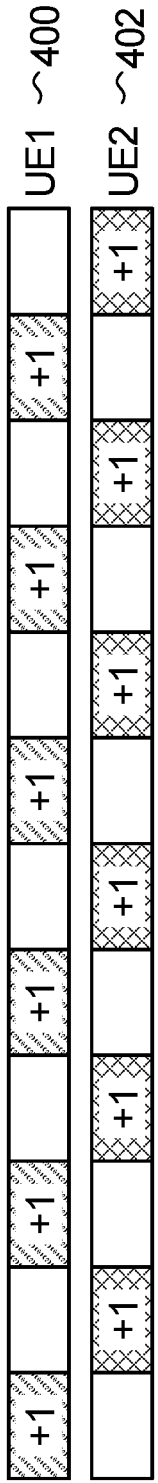
FIGS. 2A and 2B depict reference signal multiplexing using frequency division multiplexing.
Figure 2B:
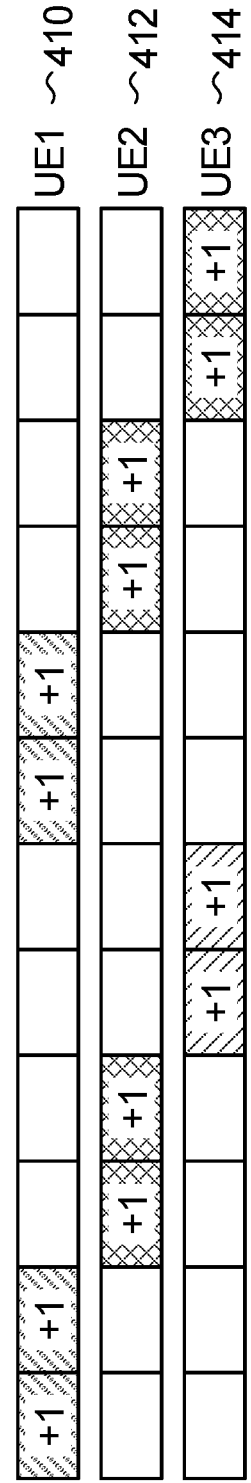

FIGS. 2 to 4 described in detail below show various examples of how to multiplex UEs (or antennas) in an orthogonal fashion. If only two UIEs need to be multiplexed, the FIG. 2A option can be used, in which frequency division multiplexing (FDM) is used. In this case, the first UE is assigned a first antenna port and the second UE is assigned antenna port 2. In general, assignment of an antenna port can be used to inform a UE of the resources to use. In this case, the two UEs can simultaneously transmits in the same timeslot. A receiver can separate them as they are orthogonal in the frequency domain. FIG. 2B shows another example of FDM where FDM is used to support three antenna ports. All three UEs transmit in the same time slot with time domain overlapping and the receiver can separate them as they are orthogonal in frequency domain. While FIGS. 2A and 2B show specific mappings to achieve the FDM of two or three users, it should be apparent that this can be generalized, and other mappings, and other numbers of users can be multiplexed in a similar manner using FDM.

Code division multiplexing can be used to further increase the number of antenna ports. For example, to support 4 antenna ports, then CDM can be used in the frequency domain together with FDM. This is shown in FIG. 3A. In this, all four UEs transmit in the same time slot with time domain overlapping. These four antenna ports are separated into two CDM groups. Within a CDM group, two UEs are overlapping in both frequency and time domain. However, an orthogonal cover code is used between these two UEs in frequency domain so that a receiver can separate them without any loss. Then, the first two UEs in CDM group 0 are orthogonal to the second two UEs in CDM group 1 in frequency domain so they can be separated easily. The example shown in FIG. 3A is a combination of CDM and FDM to multiplex 4 UEs. The same concept in used FIG. 3B to multiplex 6 UEs where there are three CDM groups which are orthogonal in frequency domain and within a CDM group an orthogonal cover code is used to make two of them orthogonal. This way all six UEs are orthogonal although they fully overlap in time domain in the transmission. Again, assignment of antenna port can be used to convey the specific frequency domain resource and code domain resource to use. More generally, CDM and FDM can be combined to increase the number of antenna ports. In addition, in some embodiments CDM may be used without FDM.

Figure 4A:
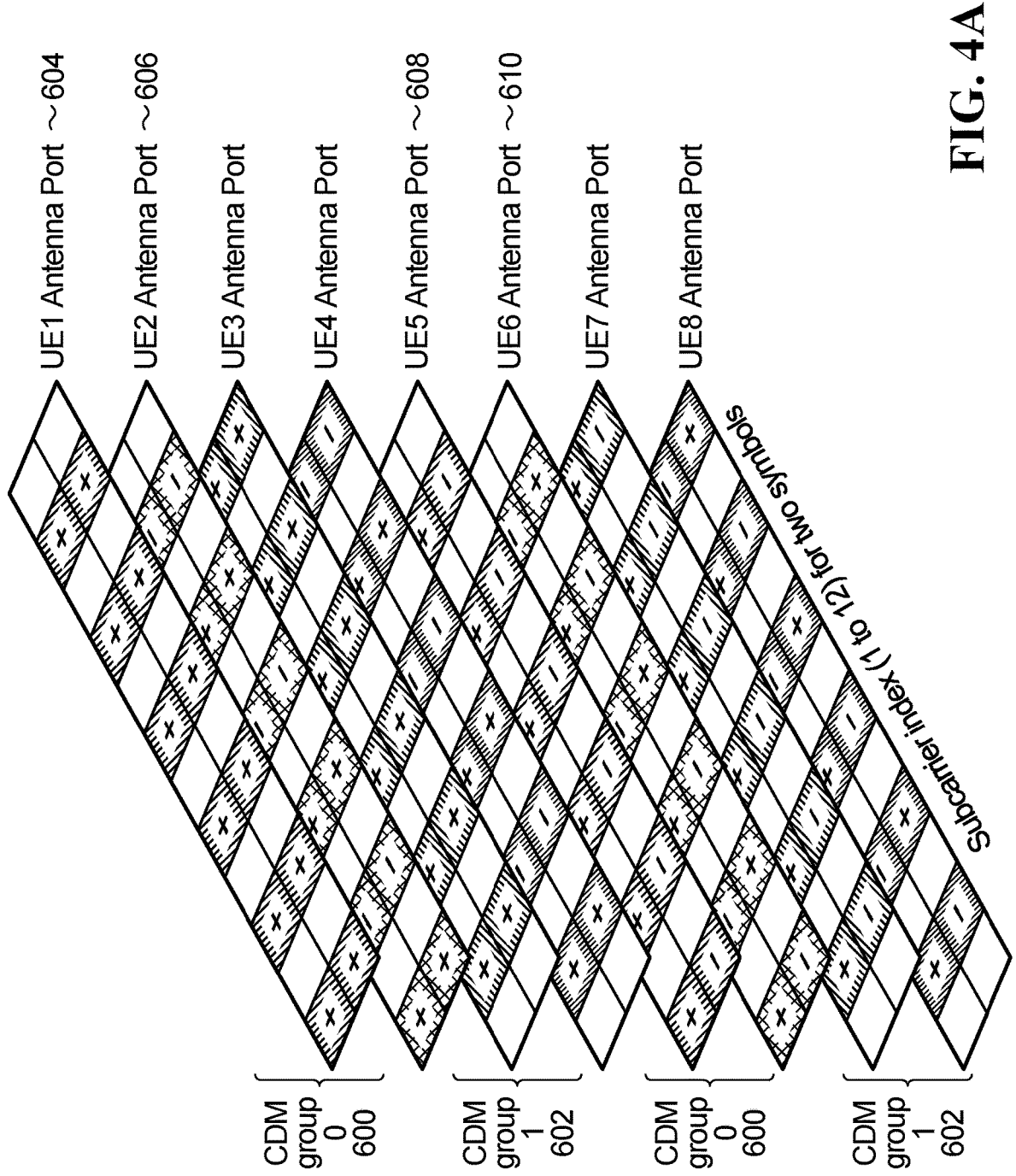
Figure 4B:
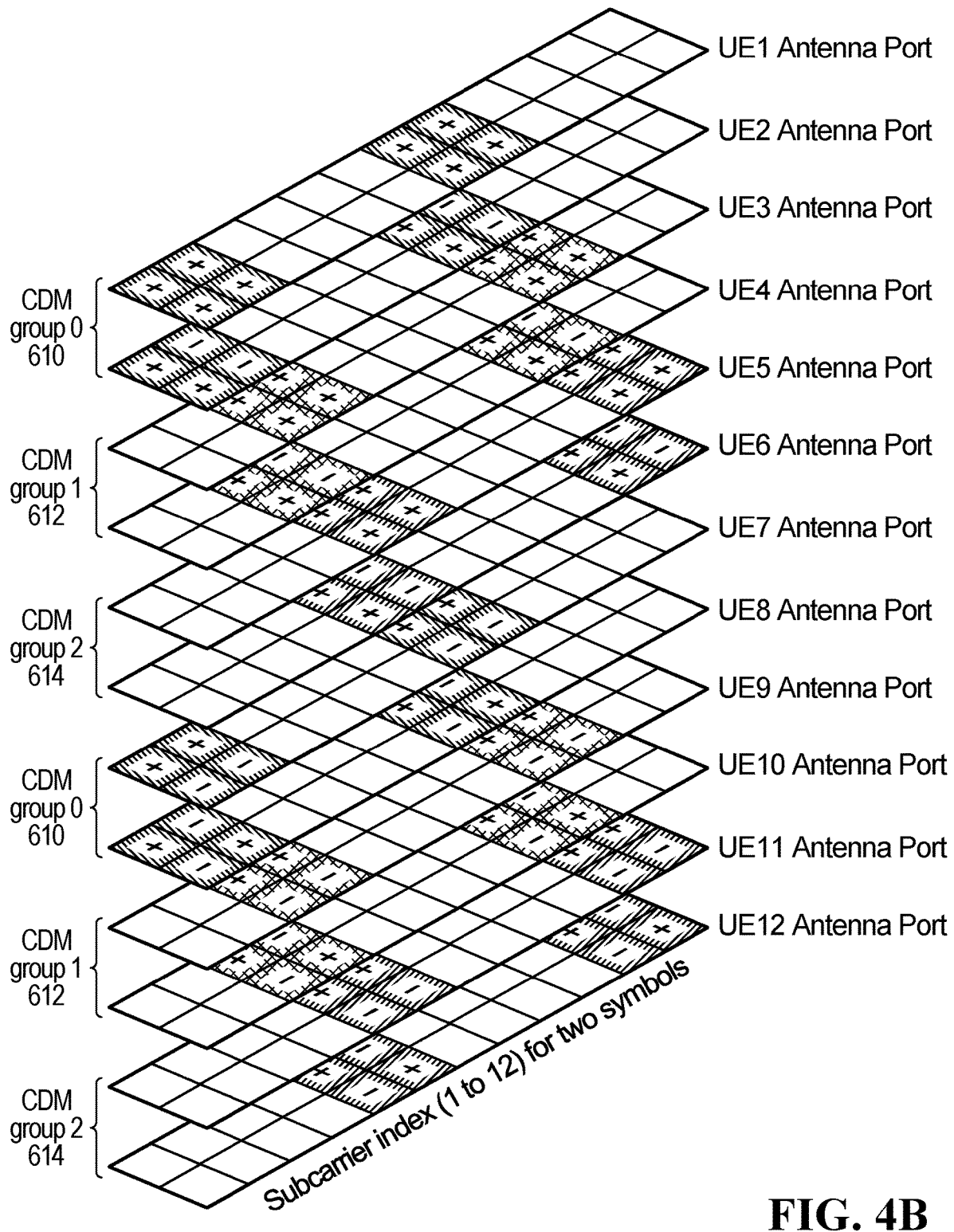

Time domain multiplexing can be used to further increase the number of antenna ports to that even more UEs can be multiplexed. The example of FIG. 4A shows 8 antenna ports and FIG. 4B shows 12 antenna ports. This approach uses a combination of FDM with frequency orthogonal mapping, CDM using an orthogonal cover code, and TDM using two symbols to make these antenna ports orthogonal at the receiver. Once a UE is assigned an antenna port, it uses the specified pattern to transmit reference signal.

FIG. 2A shows an example based on frequency division multiplexing for single symbol, which provides how different subcarrier mappings (i.e. different set of subcarrier indices J) can be used (for example in subcarrier mapper 306) to support the transmission of two sequences in the same bandwidth using frequency division multiplexing. A first antenna port 400 is defined that includes a set of odd numbered subcarriers, and a second antenna port 402 is defined that includes a set of even numbered subcarriers. In the example of FIG. 2A, each subcarrier is weighted with a "+1" which is the equivalent to the absence of CDM.

FIG. 2B shows another example of how different subcarrier mappings can be used to support the transmission of two sequences in the same bandwidth using frequency division multiplexing. Three antenna ports 410, 412, 414 are defined that use respective non-overlapping sets of subcarriers. In the example of FIG. 2B, again each subcarrier is weighted with a "+1" which is the equivalent to the absence of CDM.

While FIGS. 2A and 2B show specific examples, it should be apparent that FDM can be used to define a plurality of antenna ports that will allow simultaneous reference signal transmission within a bandwidth.

For the examples of FIGS. 2A and 2B, the subcarrier mapping can take place in subcarrier mapper 306.

In some embodiments, FDM is combined with CDM. There may be multiple, for example two or three, CDM groups. In a specific example, the precoder 302 may apply an orthogonal cover code based on {+1, −1}.

FIG. 3A shows an example where there are two CDM groups 500, 502. The first CDM group 500 has antenna ports 504, 506 and the second group 502 has antenna ports 508, 510. The sequence transmissions within each group are multiplied by respective orthogonal cover codes. FIG. 3B shows another example where there are three CDM groups each containing two antenna ports.

FIG. 4A shows an example where there are two CDM groups 600, 602. By way of example, the first CDM group 600 has four antenna ports 604, 606, 608, 610. The reference signal is transmitted over a resource that is two OFDM symbols in the time domain by 12 subcarriers in the frequency domain. The sequence transmissions within each group are multiplied by respective orthogonal cover codes. FIG. 4B shows another example where there are three CDM groups 610, 612, 614 each having four antenna ports.

The provided approach results in reference signals that have low PAPR, good auto-correlation and cross-correlation properties, and the ability to multiplex UEs in same subcarriers using OCC without losing BLER performance.

New FDSS Pulse Shape

In another embodiment, a new FDSS pulse shape is provided that is useful to obtain the desired PAPR and helps in channel estimation. This pulse shape can be used, for example, in the method and system described above, but it may also have other applications.

Let F be a frequency domain pulse coefficient vector of length M. F can be RC pulse to the power of β given by $$F(n) = RC^{\beta}(n) = \begin{cases} 1, & |w| \leq \frac{1-\alpha}{2T} \\ \left[\frac{1}{2}\left[1 + \cos\left(\frac{\pi T}{\alpha}\left(|w| - \frac{1-\alpha}{2T}\right)\right)\right]\right]^{\beta}, & \frac{1-\alpha}{2T} < |w| \leq \frac{1+\alpha}{2T} \\ 0, & \text{otherwise} \end{cases}$$

Where $$w = \frac{1}{T}\left(\frac{n}{M/2} - 1\right), 0 \leq n \leq M-1, \text{ or } w = -\frac{1}{T}, -\frac{1}{T}\left(1 - \frac{1}{M/2}\right),$$

$$-\frac{1}{T}\left(1 - \frac{2}{M/2}\right), \ldots, -\frac{1}{T}\left(1 - \frac{M/2-1}{M/2}\right), 0, \frac{1}{TM/2}, \frac{2}{TM/2}, \ldots, \frac{M/2-1}{TM/2}.$$

Further, α is the roll off factor of RC pulse. In some embodiments, β≥0.5.

In a specific embodiment, β=0.8. More generally, in some embodiments, any suitable RC pulse raised to the power of β≥0.5 is used.

By changing the β parameter, it is possible to reduce the PAPR of the reference signal. In some embodiments, the β parameter can be selected to achieve a desired trade-off between PAPR vs. BLER performance.

Note that while the new pulse shape is described for use in reference signaling, the same pulse shape can be applied for data transmission instead, or in addition. For example, the same pulse shape can be applied for FDSS$_2$ in the FIG. 5 example described below.

Reference Signal and Data Multiplexing

Figure 5:
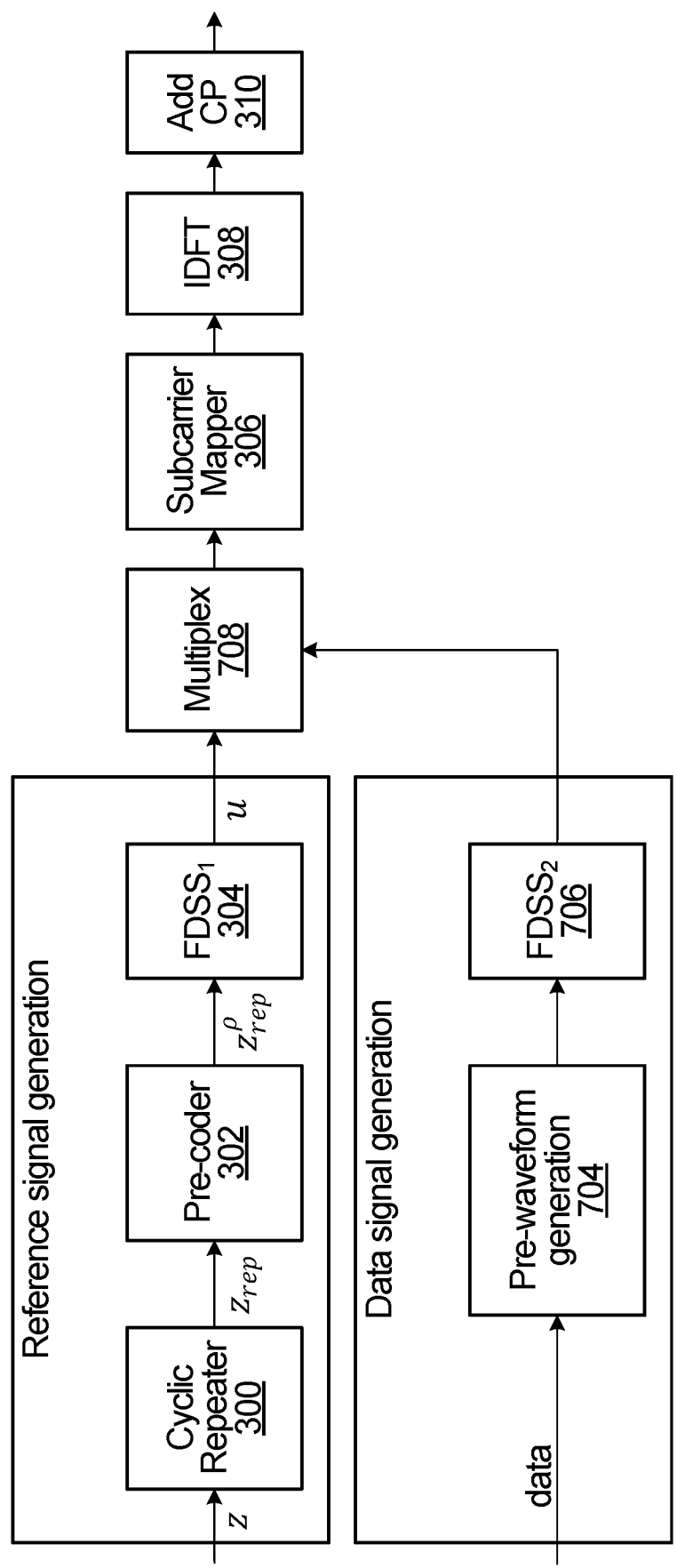
FIG. 5 is a block diagram of a system for multiplexing a reference signal with a data signal.

FIG. 5 is a block diagram showing an apparatus that multiplexes a reference signal in accordance with one of the above described embodiments with data. The components of the block diagram of FIG. 5 include all of the components of FIG. 1 pertaining to reference signal generation. Also shown are components 704, 706 pertaining to data signal generation, here data signal may comprise control information. Component 704 is labelled "pre-waveform generation", and encompasses all data processing steps that precede FDSS processing in FDSS block 706. The FDSS pulse shape for FDSS block 304, which is applied to the reference signal, is labelled FDSS$_1$, and the FDSS pulse shape for FDSS block 706, which is applied to the data signal, is labelled FDSS$_2$.

The operation of pre-waveform generation block 704 varies based on the waveform being implemented. For OFDM, it is a circular repetition, for DTF-s-OFDM, it is DFT followed by a circular repetition. For SC-OQAM, it is pre-processor that separates to real and imaginary symbols followed by a DFT.

In some embodiments, the data and reference signal use the same common pulse shape in the FDSS operation: FDSS$_1$=FDSS$_2$.

In some embodiments, the data pulse shape FDSS$_1$=DMRS pulse shape FDSS$_2$ are not specified or signaled.

In some embodiments, the common pulse shape predefined and known to the UE. In some embodiments, the common pulse shape is configured to the UE. In some embodiments, the common pulse shape is indicated to the UE by signaling (for example using higher layer signaling or medium access control (MAC) control entity (CE) or downlink control information (DCI).

In another embodiment, different pulse shapes are used for reference signals and data: FDSS$_1$≠FDSS$_2$.

In some embodiments, the data pulse shape FDSS$_1$ and DMRS pulse shape FDSS$_2$ are not specified or signaled.

In some embodiments, the data pulse shape FDSS$_1$ and DMRS pulse shape FDSS$_2$ are predefined.

In some embodiments, at least one of the data pulse shape FDSS$_1$ and DMRS pulse shape FDSS$_2$ is indicated to the UE by signaling (higher layer signaling, MAC CE, DCI)

This embodiment proposed the approach to multiplex reference signal with data. Different approaches give the flexibility to optimize PAPR and BLER performances.

Receiver Embodiments

There are two alternative types of receivers that depend on whether the receiver has knowledge of the FDSS pulse shape used at the transmitter. The first alternative, referred to herein as a transparent receiver, can be used where receiver does not have knowledge of the FDSS pulse shape(s) used at the transmitter. The second alternative, referred to herein as a non-transparent receiver, can be used where the receiver has knowledge of the FDSS pulse shape(s).

Figure 6:
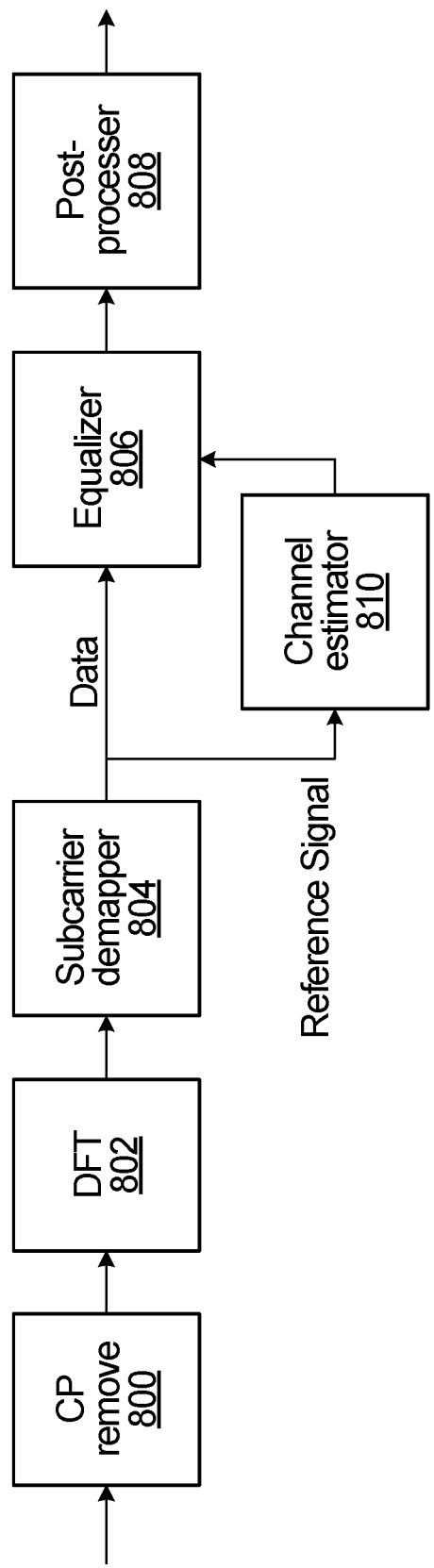
FIG. 6 is a receiver block diagram for a transparent receiver.

A block diagram of an example implementation of a transparent receiver is depicted in FIG. 6. The receiver includes: a CP remover 800 that removes the cyclic prefix; a DFT block 802 that performs a discrete Fourier transform. A subcarrier demapper 804 that performs subcarrier demapping. A data portion of the output of the subcarrier demapper 804 is equalized by equalizer 806. A reference signal portion of the output of the subcarrier demapper 804 is processed by channel estimator 810 which produces channel estimates that are fed to the equalizer 806. The output of the equalizer is processed in post-processor 808 which will also take into account any pre-coding performed in the transmitter.

With the embodiment of FIG. 6, the pulse shape is not known at the receiver, thus it is not necessary to specify the pulse shape to the receiver. A feature of the transparent receiver is that when channel estimation is performed (in channel estimator (810), it estimates the channel and pulse shape together. This approach yields better performance with when both data and reference signal use the same pulse shape. If the same pulse shape is not used, there will be a mismatch in pulse shape, which may result in BLER degradation. In embodiments where the pulse shape is neither predefined, nor signaled to the UE, this may be the only receiver option.

In embodiments were the pulse shape(s) might be known to the receiver, a transparent receiver might still be used.

Figure 7:
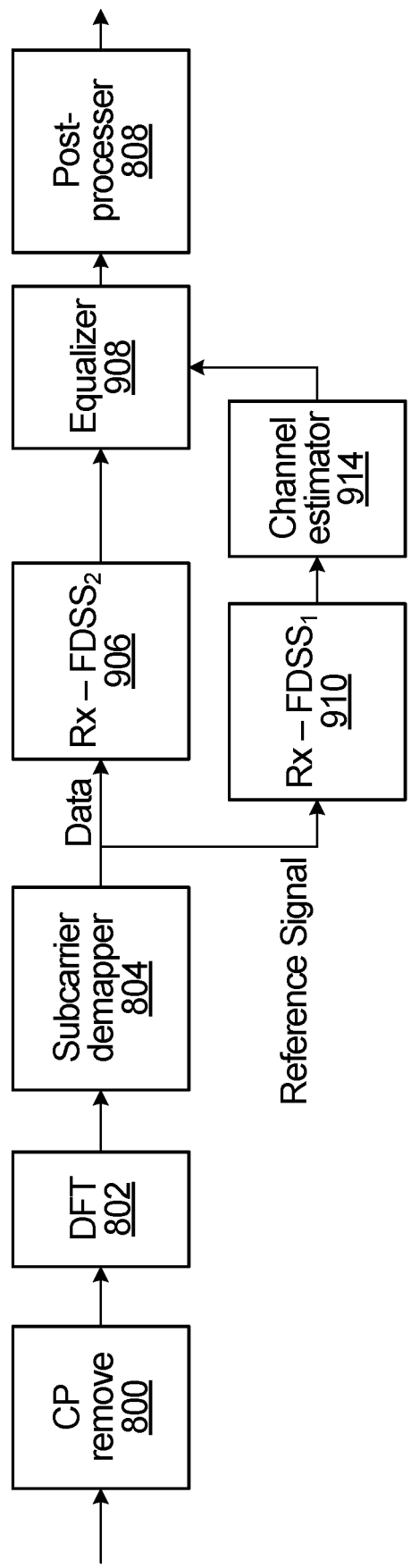
FIG. 7 is a receiver block diagram for a non-transparent receiver.

A block diagram of a non-transparent receiver is shown in FIG. 7. This is for the most part similar to the receiver of FIG. 6, but the data portion of the output of the subcarrier demapper 804 is processed with receive FDSS block 906 which implements pulse shape Rx-FDSS$_2$ then equalized in equalizer 908. The reference signal portion of the output of the subcarrier demapper 804 is processed with receive FDSS block 910 which implements pulse shape Rx-FDSS$_1$ then processed by channel estimator 914. Pulse shapes Rx-FDSS$_2$ and Rx-FDSS$_1$ correspond to pulse shapes used in the transmitter.

For the embodiment of FIG. 7, the pulse shape(s) are known to the receiver, for example, predefined, preconfigured or signaled.

In embodiments in which the transmit pulse shapes are the same, Rx-FDSS$_1$=Rx-FDSS$_2$.

In embodiments in which the transmit pulse shapes are different, Rx-FDSS$_1 \neq$Rx-FDSS$_2$.

In a non-transparent receiver, only the channel will be estimated and used for equalization. This approach results in better performance.

Different types of receivers have been described with reference to FIGS. 6 and 7. This allows the receiver designer to work with different settings such as pulse shape availability.

Signaling Diagrams

Figure 8:
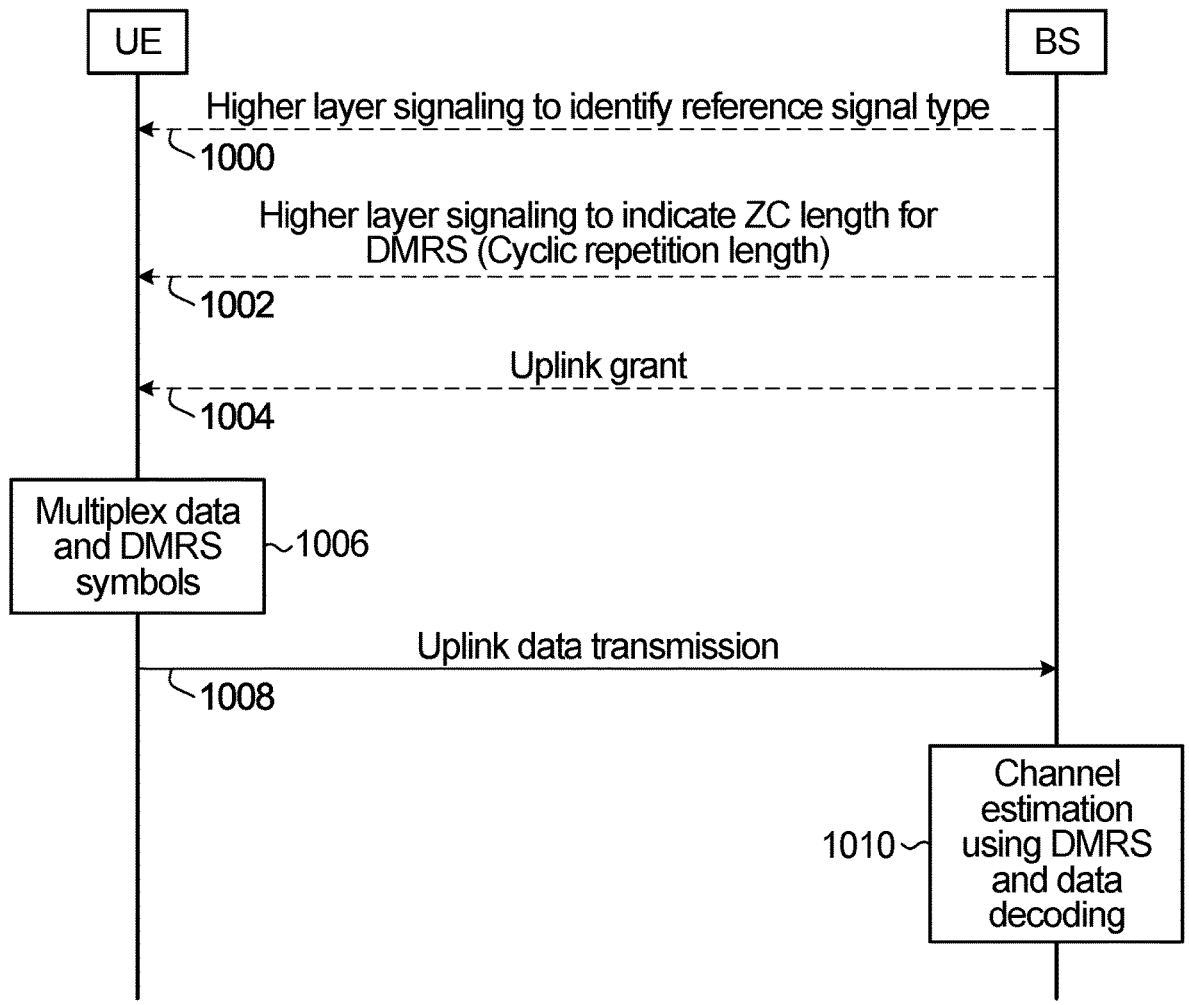
FIG. 8 is a signaling diagram for a transparent receiver.

FIG. 8 is a signaling diagram for the transparent receiver case. The signaling includes higher layer signaling 1000 from a base station (BS) to a UE to identify reference signal type. The reference signal type signaling would be used in some examples where multiple reference signal types are possible, one of which is the provided reference signal type. For example, the multiple reference signal types may include a low PAPR reference signal or a default reference signal which does not have low PAPR. Next, there is higher layer signaling 1002 to indicate ZC sequence length for DMRS This represents the length of the ZC sequence that is subject to cyclic repetition, e.g. the ZC sequence length for DMRS in FIG. 1A. An uplink grant is transmitted at 1004. At 1006, the UE multiplexes data and DMRS symbols, e.g. the ZC sequence length for DMRS in FIG. 5. And at 1008, the UE transmit an uplink data. In the BS, at 1010 channel estimation is performed using the DMRS, e.g. the in FIG. 6, and then data decoding is performed. In this case, the UE can choose what pulse shape to use. The receiver does not need to know the pulse shape, but rather estimates the combined channel plus pulse shape.

If the UE is not indicated what pulse to use, there may be a default configuration, which the UE knows (for example, beta=0.5). This can be the case when for instance the UE is not coverage limited or is transmitting higher order QAM.

Figure 9:
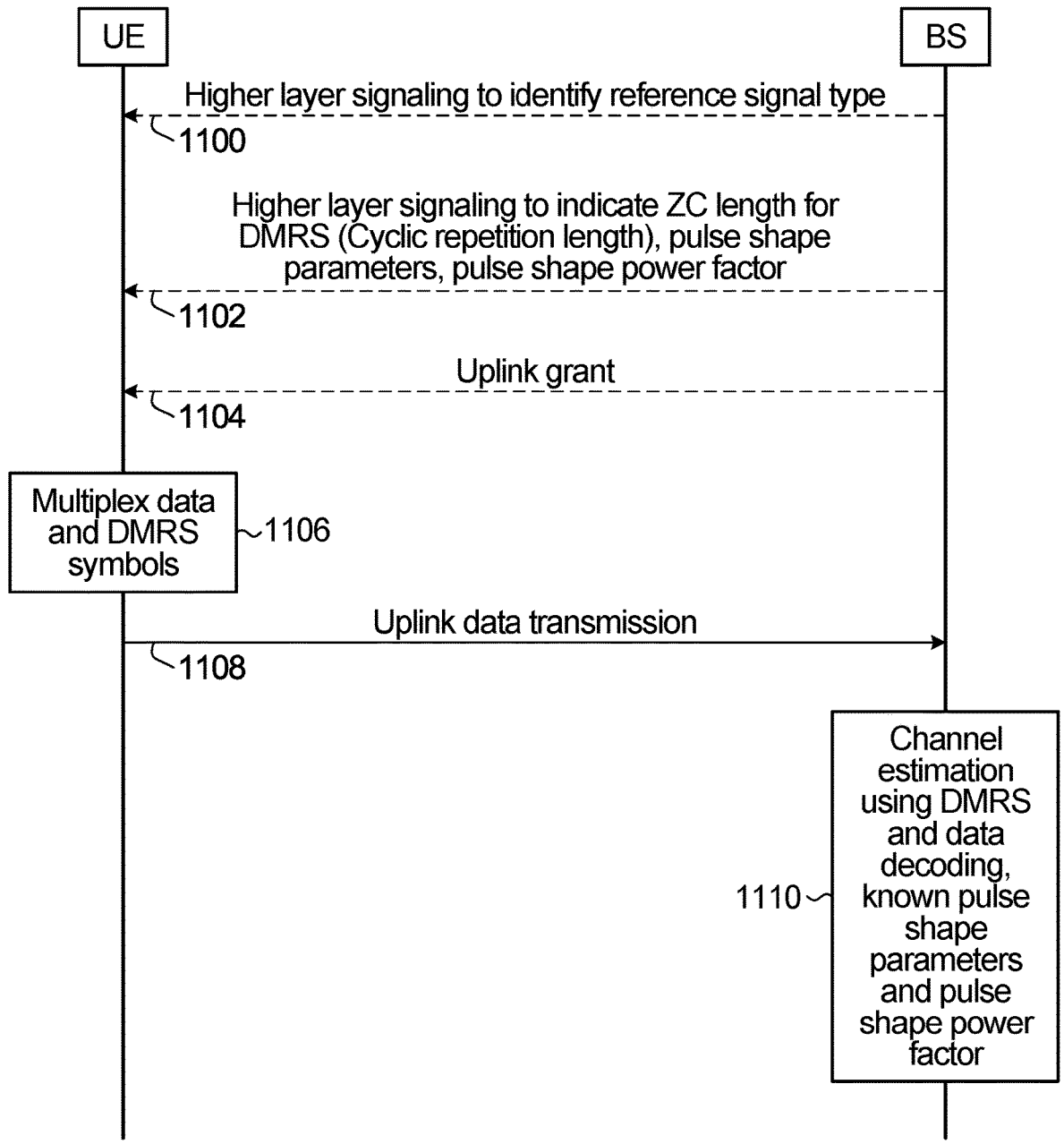
FIG. 9 is a signaling diagram for a non-transparent receiver.

FIG. 9 is a signaling diagram for the non-transparent receiver case. The signaling includes higher layer signaling 1100 from a base station (BS) to a UE to identify reference signal type. Next, there is higher layer signaling 1102 to indicate ZC sequence length for DMRS. This represents the length of the ZC sequence that is subject to cyclic repetition. The higher layer signaling 1102 also includes pulse shape parameters and pulse shape power factor, this referring to the above referenced $\beta$ parameter of an RC which yields RC$^\beta$. An uplink grant is transmitted at 1004. At 1106, the UE multiplexes data and DMRS symbols, and makes an uplink data transmission 1108. In the BS, at 1110 channel estimation is performed using the DMRS, and then data decoding is performed. The BS makes use of the known pulse shape parameters and pulse shape power factor.

In the two examples of FIGS. 8 and 9, the network signals the ZC length to the UE. In another embodiment, this is not signaled, and instead, the UE calculates the ZC length based on the allocated bandwidth.

In non-transparent receiver, the Rx pulse shape can be defined to match the transmit pulse shape. For example, the transmit pulse shape may be the new FDSS pulse shape introduced above.

Let F be M length frequency domain pulse coefficient vector. F can be RC pulse to the power of $\gamma=1-\beta$ where $\beta$ is used in the transmit pulse shape.

$$F(n) = RC^\gamma(n) = \begin{cases} 1, & |w| \leq \frac{1-\alpha}{2T} \\ \left[\frac{1}{2}\left[1 + \cos\left(\frac{\pi T}{\alpha}\left(|w| - \frac{1-\alpha}{2T}\right)\right)\right]\right]^\gamma, & \frac{1-\alpha}{2T} < |w| \leq \frac{1+\alpha}{2T} \\ 0, & \text{otherwise} \end{cases}$$

Where $$w = \frac{1}{T}\left(\frac{n}{M/2} - 1\right), 0 \leq n \leq M-1, \text{ or } w = -\frac{1}{T}, -\frac{1}{T}\left(1 - \frac{1}{M/2}\right),$$

$$-\frac{1}{T}\left(1 - \frac{2}{M/2}\right), \ldots, -\frac{1}{T}\left(1 - \frac{M/2-1}{M/2}\right), 0, \frac{1}{TM/2}, \frac{2}{TM/2}, \ldots, \frac{M/2-1}{TM/2}$$

This specific pulse shape guarantees that the combined pulse shape of the transmitter and the receiver creates a Nyquist RC pulse. Therefore, it results in better channel estimation performance.

More generally, depending on the RC pulse used in the transmitter, in the receiver, whatever pulse shape is needed to create a Nyquist RC pulse may be employed. For example, an RC pulse raise to the power of $\gamma=1-\beta$ may be used in the receiver where $\beta$ is used in the transmit pulse shape.

Although the reference signals provided in the above described embodiment are particularly suitable for low PAPR waveforms such as SC-OQAM, $\pi/2$-BPSK, etc, it can very well be used for any other not-necessarily low-PAPR waveform.

Figure 10:
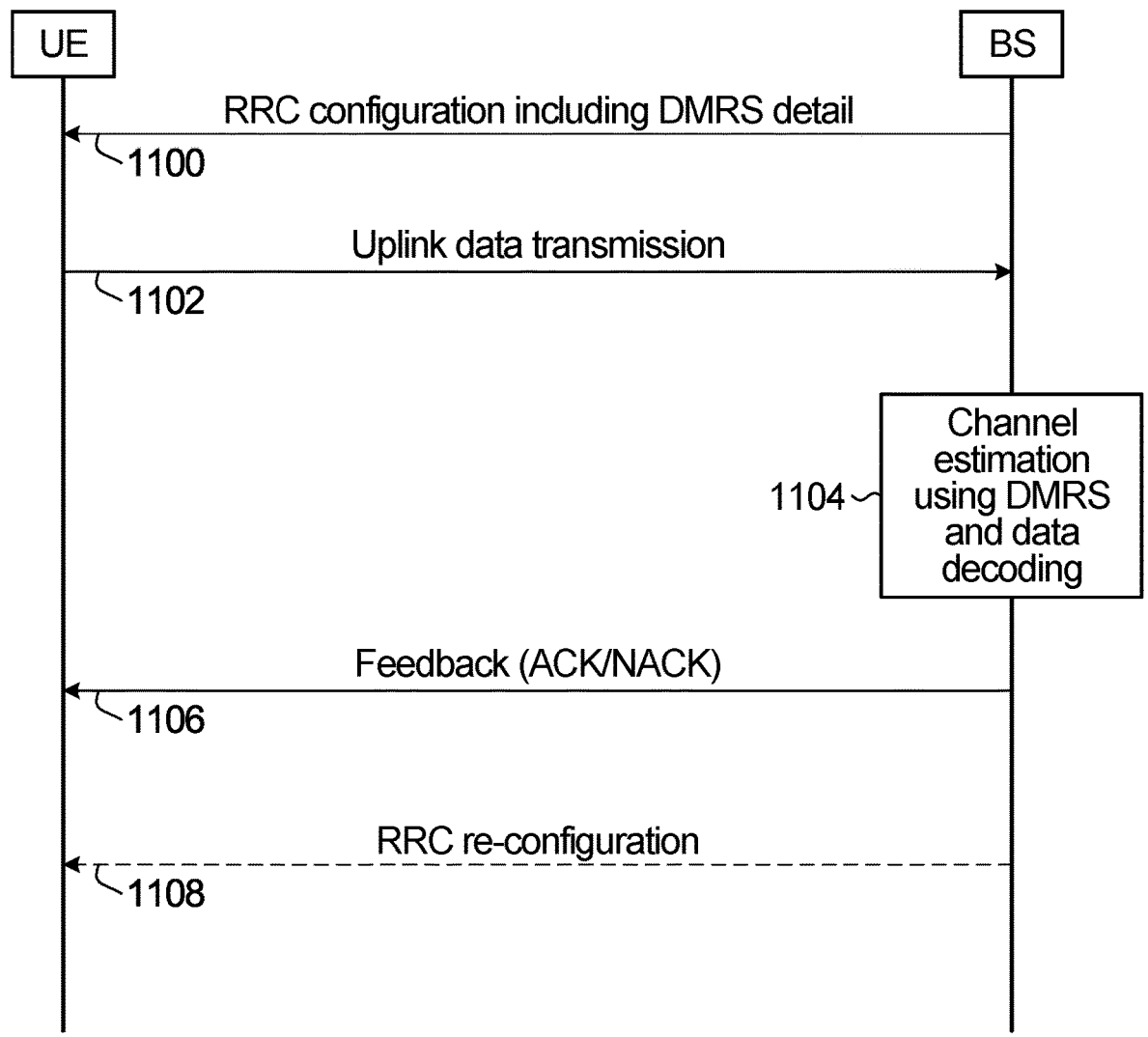
FIG. 10 is a signaling diagram for grant-free transmission.

FIG. 10 is a signaling diagram for an uplink grant-free transmission case. The signaling includes higher layer signaling 1100 (e.g. RRC signaling) from a BS to a UE containing DMRS configuration. Next, the UE makes a grant free data transmission at 1102. The BS performs channel estimation using DMRS and performs data decoding at 1104. The BS feeds back ACK/NACK at 1106. The BS sends signaling to reconfigure the DMRS at 1108.

In the description above, the focus is on transmission of reference signals in the uplink. However, it should be understood that reference signals having the same format can be transmitted in other contexts. To name a few examples, the references signals can be used for downlink transmission, sidelink transmission, transmission from transmission receive points (TRPs) of any type, such as terrestrial TRPs including base stations, eNB, non-terrestrial TRPs including satellite, drone, and other terrestrial nodes; phones, V2x devices, sensors, and wearable devices.

Downlink DMRS-Transparent Receiver

Figure 11:
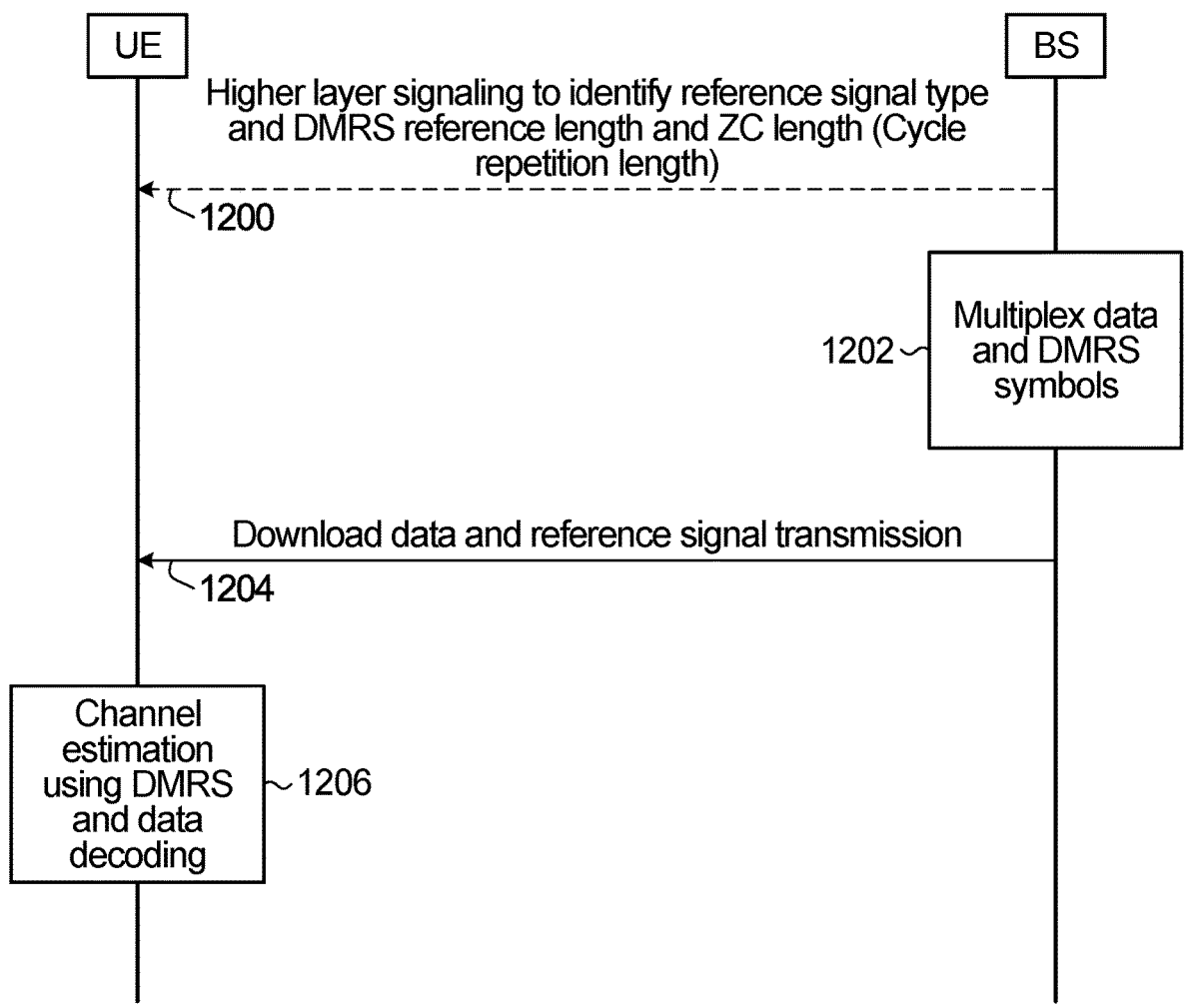
FIG. 11 is an example of a signaling diagram for a downlink reference signal transmission for the case of a transparent receiver.

FIG. 11 is an example of a signaling diagram for a downlink reference signal transmission for the case of a transparent receiver. The signaling includes higher layer signaling 1200 (e.g. RRC signaling) from a BS to a UE containing DMRS configuration, such as reference signal type, reference length, and ZC length (cyclic repetition length). As the receiver is a transparent receiver, the pulse shaping parameters are not included in the DMRS configuration. At 1202, the BS multiplexes data and DMRS symbols, and at 1204, the BS transmits a downlink signal containing the multiplexed data and DMRS symbols. At 1206, the UE performs channel estimation using the DMRS and then decodes the data. The channel estimate will include the effects of the channel per se, and the DMRS pulse shape.

Downlink DMRS-Non-Transparent Receiver

Figure 12:
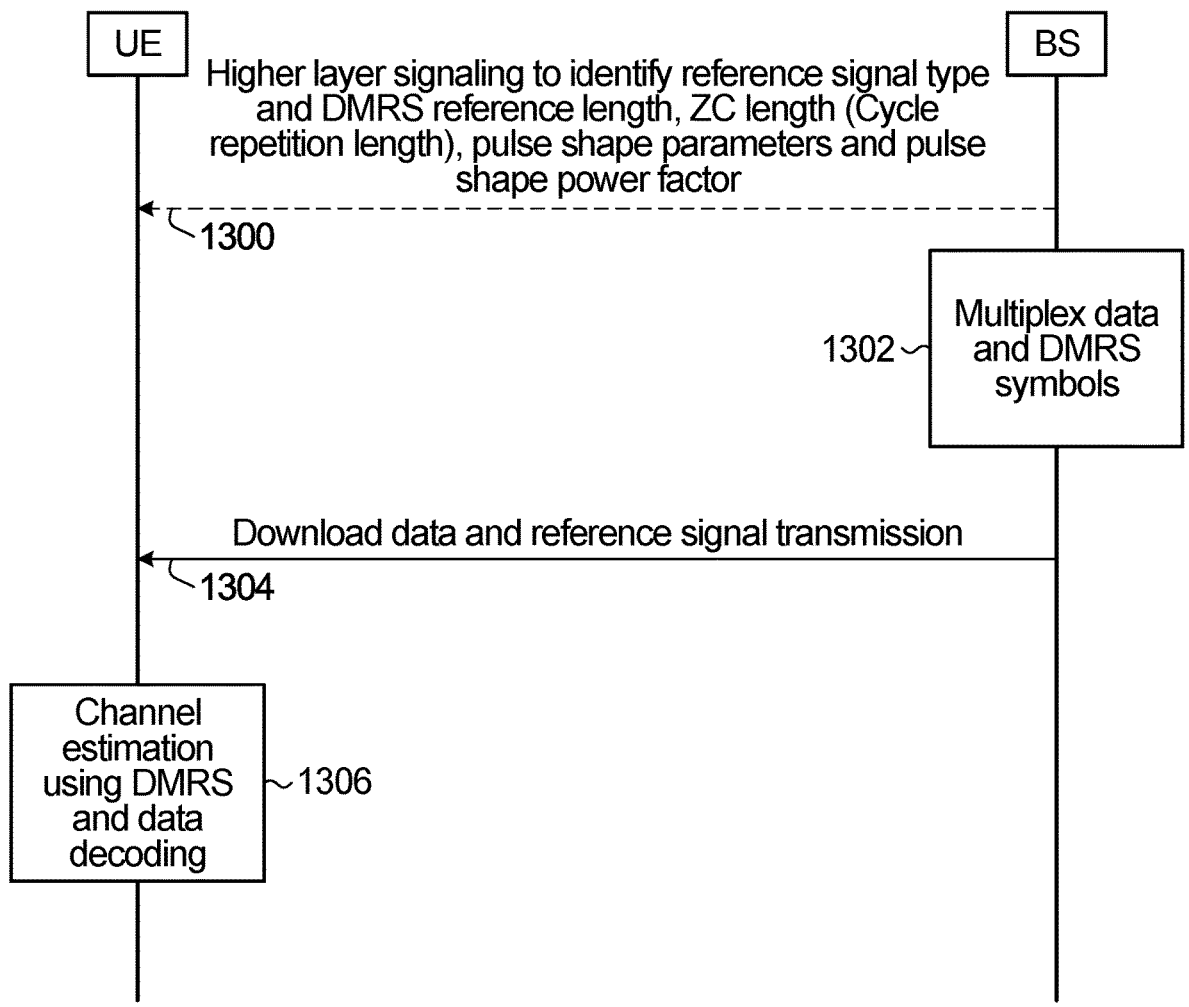
FIG. 12 is an example of a signaling diagram for a downlink reference signal transmission for the case of a non-transparent receiver.

FIG. 12 is an example of a signaling diagram for a downlink reference signal transmission for the case of a non-transparent receiver. The signaling includes higher layer signaling 1300 (e.g. RRC signaling) from a BS to a UE containing DMRS configuration, such as reference signal type, reference length, and ZC length (cyclic repetition length), and including pulse shaping parameters and pulse shape power factor. As the receiver is a non-transparent receiver, the pulse shaping parameters are included in the DMRS configuration. At 1302, the BS multiplexes data and DMRS symbols, and at 1304, the BS transmits a downlink signal containing the multiplexed data and DMRS symbols. At 1306, the UE performs channel estimation using the DMRS and then decodes the data. The UE uses the DMRS configuration to determine the exact reference signal and uses this when performing channel estimation.

Sidelink DMRS-Transparent Receiver

Figure 13:
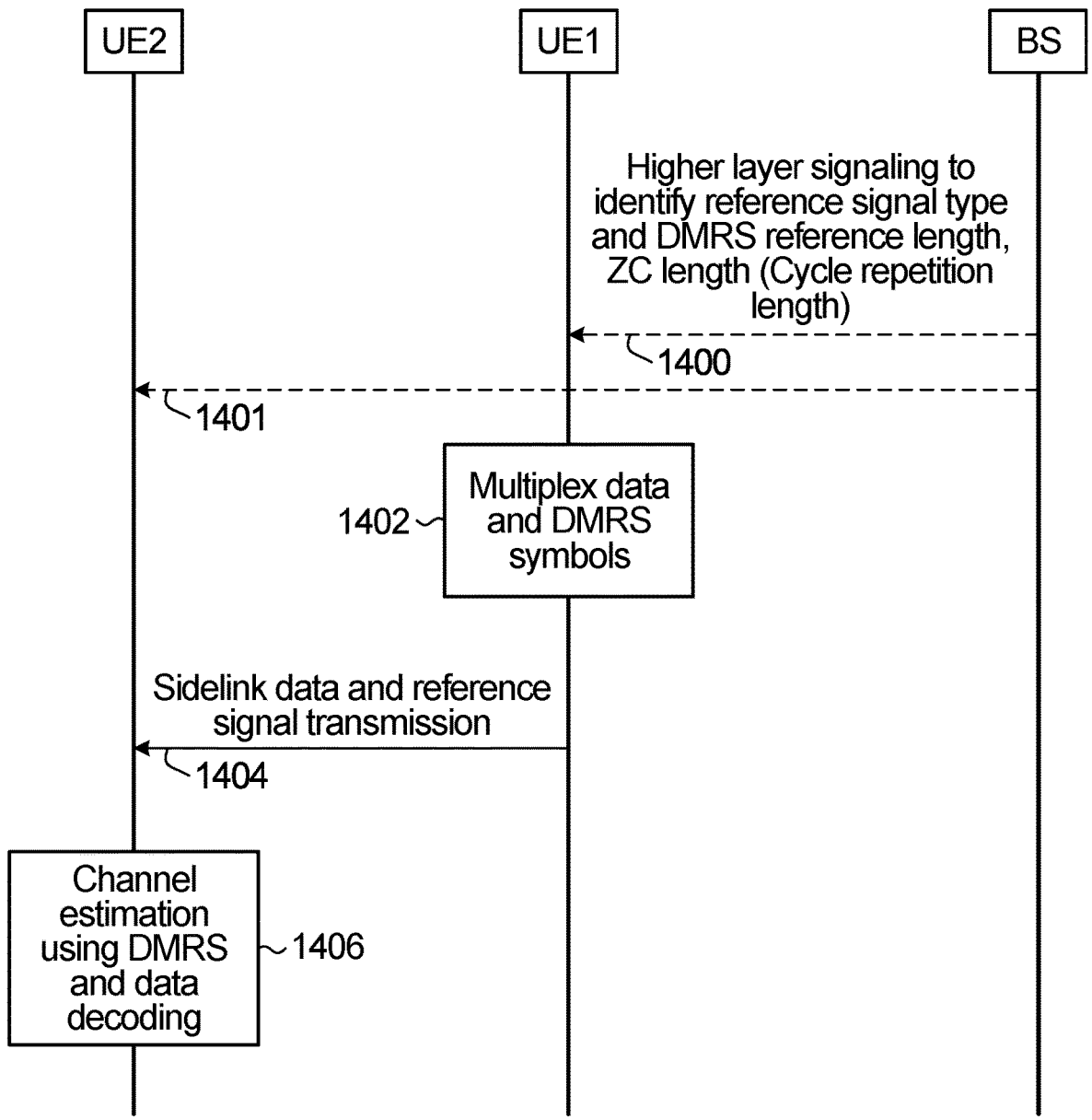
FIG. 13 is an example of a signaling diagram for a sidelink reference signal transmission for the case of a transparent receiver.

Sidelink DMRS transmission may occur between two UEs that are generally still controlled by the base station. FIG. 13 is an example of a signaling diagram for a sidelink reference signal transmission for the case of a transparent receiver. The signaling includes higher layer signaling 1400 to a first UE, UE1 and signaling 1401 to a second UE, UE2. This might be, for example, RRC signaling. The signaling contains DMRS configuration, such as reference signal type, reference length, and ZC length (cyclic repetition length). As the receiver is a transparent receiver, the pulse shaping parameters are not included in the DMRS configuration. At 1402, UE1 multiplexes data and DMRS symbols, and at 1404, the UE1 transmits a sidelink signal containing the multiplexed data and DMRS symbols. At 1406, UE2 performs channel estimation using the DMRS and then decodes the data.

Sidelink DMRS-Non-Transparent Receiver

Figure 14:
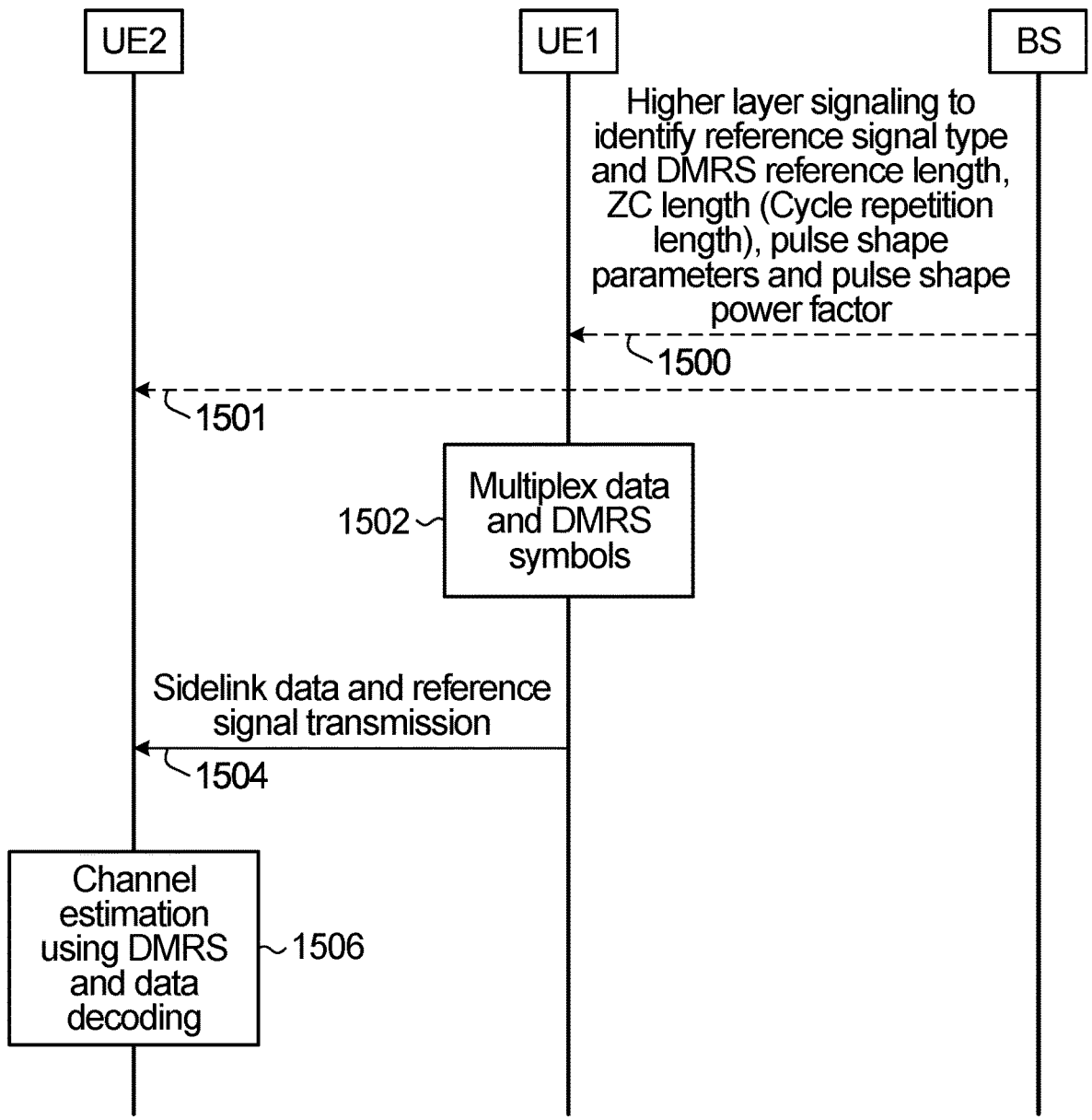
FIG. 14 is an example of a signaling diagram for a sidelink reference signal transmission for the case of a non-transparent receiver.

FIG. 14 is an example of a signaling diagram for a sidelink reference signal transmission for the case of a non-transparent receiver. The signaling includes higher layer signaling 1500 to a first UE, UE1 and signaling 1501 to a second UE, UE2. This might be, for example, RRC signaling. The signaling contains DMRS configuration, such as reference signal type, reference length, and ZC length (cyclic repetition length), and including pulse shaping parameters and pulse shape power factor. As the receiver is a non-transparent receiver, the pulse shaping parameters are included in the DMRS configuration. At 1502, UE1 multiplexes data and DMRS symbols, and at 1504, the UE1 transmits a sidelink signal containing the multiplexed data and DMRS symbols. At 1406, UE2 performs channel estimation using the DMRS, with knowledge of the transmitted DRMS pulse shape, and then decodes the data.

Although not shown in the Figures, in another embodiment for sidelink transmission, the transmitter UE (UE1) configures parameters for DMRS transmission and sends them to the receiving UE (UE2), for example via SCI (side link control information) or PC5 (SL RRC).

Figure 15:
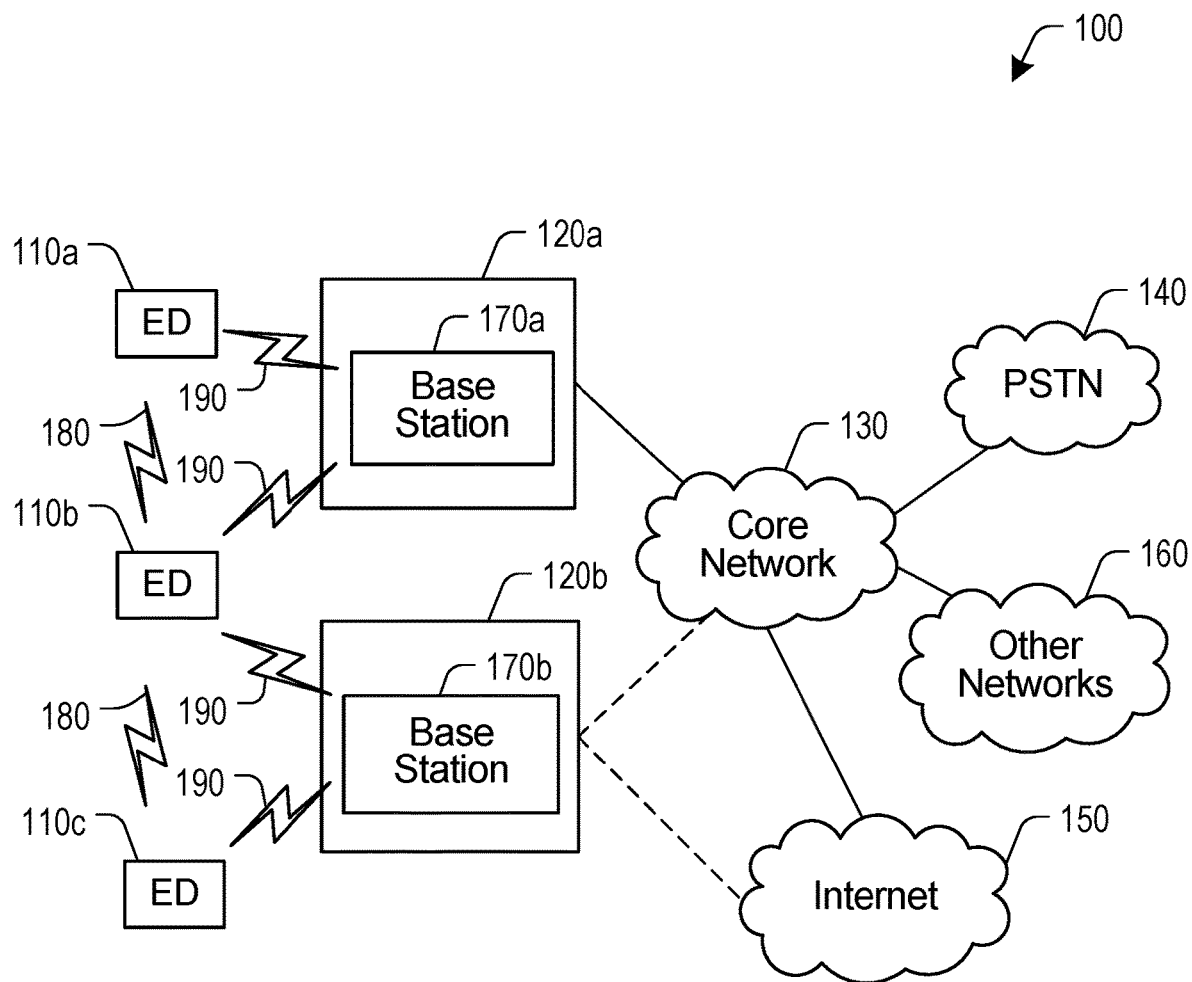
FIG. 15 shows an example of a network for implementing one or more embodiments of the disclosure.

FIG. 15 illustrates an example communication system 100 in which embodiments of the present disclosure may be implemented. In general, the communication system 100 enables multiple wireless or wired elements to communicate data and other content. The purpose of the communication system 100 may be to provide content (voice, data, video, text) via broadcast, narrowcast, user device to user device, etc. The communication system 100 may operate by sharing resources such as bandwidth.

In this example, the communication system 100 includes electronic devices (ED) 110a-110c, radio access networks (RANs) 120a-120b, a core network 130, a public switched telephone network (PSTN) 140, the internet 150, and other networks 160. Although certain numbers of these components or elements are shown in FIG. 15, any reasonable number of these components or elements may be included in the communication system 100.

The Eds 110a-110c are configured to operate, communicate, or both, in the communication system 100. For example, the Eds 110a-110c are configured to transmit, receive, or both via wireless or wired communication channels. Each ED 110a-110c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 15, the RANs 120a-120b include base stations 170a-170b, respectively. Each base station 170a-170b is configured to wirelessly interface with one or more of the Eds 110a-110c to enable access to any other base station 170a-170b, the core network 130, the PSTN 140, the internet 150, and/or the other networks 160. For example, the base stations 170a-170b may include (or be) one or more of several well-known devices, such as a base transceiver station (BTS), a Node-B (NodeB), an evolved NodeB (eNodeB), a Home eNodeB, a gNodeB, a transmission point (TP), a site controller, an access point (AP), or a wireless router. Any ED 110a-110c may be alternatively or additionally configured to interface, access, or communicate with any other base station 170a-170b, the internet 150, the core network 130, the PSTN 140, the other networks 160, or any combination of the preceding. The communication system 100 may include RANs, such as RAN 120b, wherein the corresponding base station 170b accesses the core network 130 via the internet 150, as shown. The detailed embodiments described herein make reference to TPs, but more generally, any type of base station can be used for any of the embodiments described herein.

The Eds 110a-110c and base stations 170a-170b are examples of communication equipment that can be configured to implement some or all of the functionality and/or embodiments described herein. In the embodiment shown in FIG. 15, the base station 170a forms part of the RAN 120a, which may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b transmits and/or receives wireless signals within a particular geographic region or area, sometimes referred to as a "cell" or "coverage area". A cell may be further divided into cell sectors, and a base station 170a-170b may, for example, employ multiple transceivers to provide service to multiple sectors. In some embodiments there may be established pico or femto cells where the radio access technology supports such. In some embodiments, multiple transceivers could be used for each cell, for example using multiple-input multiple-output (MIMO) technology. The number of RAN 120a-120b shown is exemplary only. Any number of RAN may be contemplated when devising the communication system 100.

The base stations 170a-170b communicate with one or more of the Eds 110a-110c over one or more air interfaces 190 using wireless communication links e.g. radio frequency (RF), microwave, infrared (IR), etc., The air interfaces 190 may utilize any suitable radio access technology. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as HSPA, HSPA+ optionally including HSDPA, HSUPA or both. Alternatively, a base station 170a-170b may establish an air interface 190 with Evolved UTMS Terrestrial Radio Access (E-UTRA) using LTE, LTE-A, LTE-B and/or New Radio (NR). It is contemplated that the communication system 100 may use multiple channel access functionality, including such schemes as described above. Other radio technologies for implementing air interfaces include IEEE 802.11, 802.15, 802.16, CDMA2000, CDMA2000 1×, CDMA2000 EV-DO, IS-2000, IS-95, IS-856, GSM, EDGE, and GERAN. Of course, other multiple access schemes and wireless protocols may be utilized.

The RANs 120a-120b are in communication with the core network 130 to provide the Eds 110a-110c with various services such as voice, data, and other services. The RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or Eds 110a-110c or both, and (ii) other networks (such as the PSTN 140, the internet 150, and the other networks 160). In addition, some or all of the Eds 110a-110c may include functionality for communicating with different wireless networks over different wireless links using different wireless technologies and/or protocols. Instead of wireless communication (or in addition thereto), the Eds may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as IP, TCP, UDP. Eds 110a-110c may be multimode devices capable of operation according to multiple radio access technologies, and incorporate multiple transceivers necessary to support such.

Figure 16A:
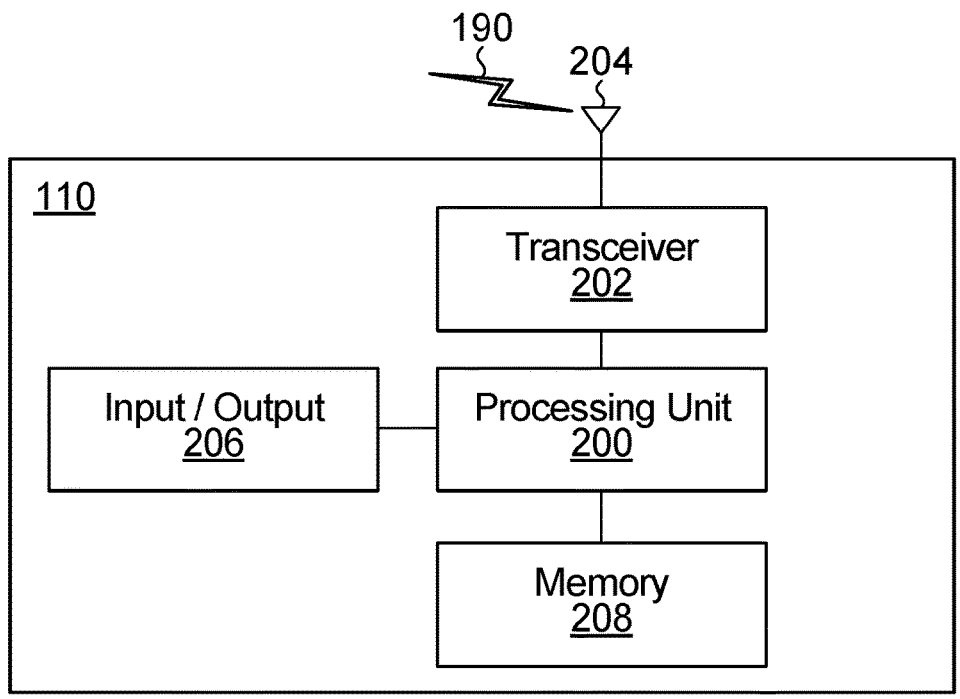
FIG. 16A is a block diagram of an example electronic device.
Figure 16B:
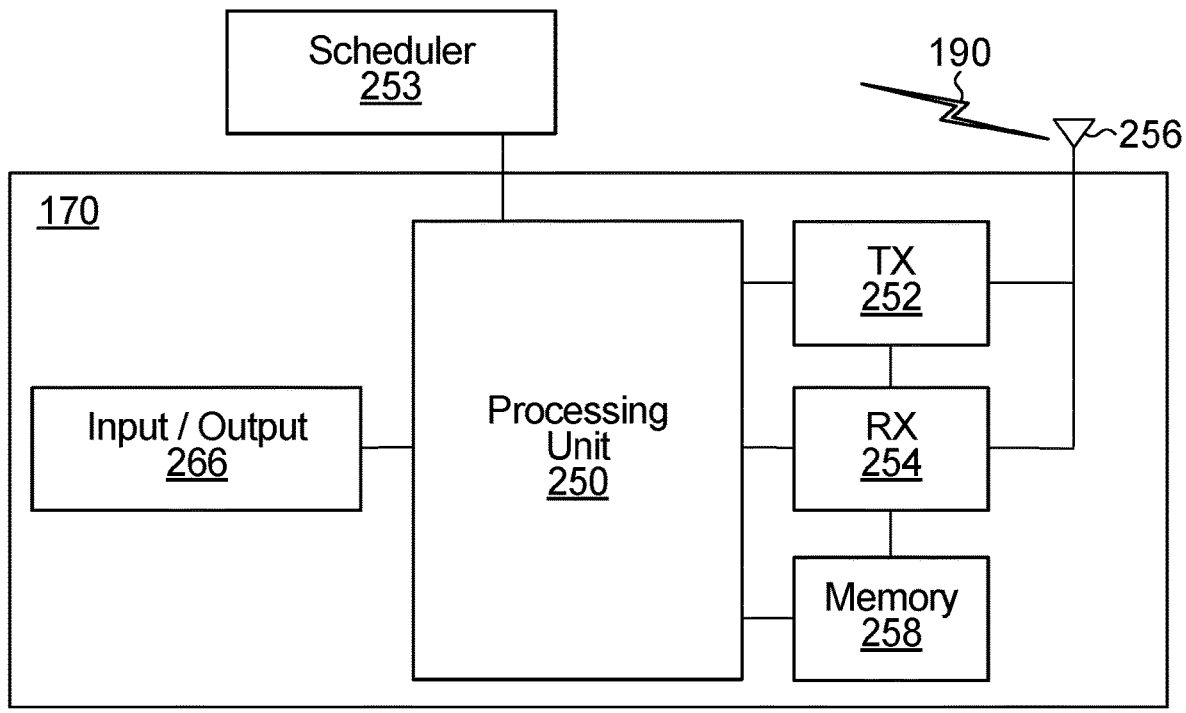
FIG. 16B is a block diagram of an example electronic device.

FIG. 16A and FIG. 16B illustrate example devices that may implement the methods and teachings according to this disclosure. In particular, FIG. 16A illustrates an example ED 110, and FIG. 16B illustrates an example base station 170. These components could be used in the communication system 100 or in any other suitable system. For example, the ED of FIG. 16A may implement the functionality of FIG. 4 and/or that of FIG. 5. The base station of FIG. 16B may implement the functionality of FIG. 4 and/or that of FIG. 5.

As shown in FIG. 16A, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the communication system 100. The processing unit 200 may also be configured to implement some or all of the functionality and/or embodiments described in more detail above. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna or Network Interface Controller (NIC) 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110. One or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet 150). The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software instructions or modules configured to implement some or all of the functionality and/or embodiments described above and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 16B, the base station 170 includes at least one processing unit 250, at least one transmitter 252, at least one receiver 254, one or more antennas 256, at least one memory 258, and one or more input/output devices or interfaces 266. A transceiver, not shown, may be used instead of the transmitter 252 and receiver 254. A scheduler 253 may be coupled to the processing unit 250. The scheduler 253 may be included within or operated separately from the base station 170. The processing unit 250 implements various processing operations of the base station 170, such as signal coding, data processing, power control, input/output processing, or any other functionality. The processing unit 250 can also be configured to implement some or all of the functionality and/or embodiments described in more detail above. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more Eds or other devices. Each receiver 254 includes any suitable structure for processing signals received wirelessly or by wire from one or more Eds or other devices. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s) such as those described above in connection to the ED 110. The memory 258 stores instructions and data used, generated, or collected by the base station 170. For example, the memory 258 could store software instructions or modules configured to implement some or all of the functionality and/or embodiments described above and that are executed by the processing unit(s) 250.

Each input/output device 266 permits interaction with a user or other devices in the network. Each input/output device 266 includes any suitable structure for providing information to or receiving/providing information from a user, including network interface communications.

Additional details regarding the Eds 110 and the base stations 170 are known to those of skill in the art. As such, these details are omitted here for clarity.

Numerous modifications and variations of the present disclosure are possible in light of the above teachings. It is therefore to be understood that within the scope of the appended claims, the disclosure may be practiced otherwise than as specifically described herein.

The invention claimed is:

1. A method comprising:
receiving, by an apparatus from a network device, a first signaling indicating a length K sequence;
transmitting, by the apparatus to the network device a reference signal;
wherein the reference signal is obtained from the length K sequence, and the length K sequence is obtained by a cyclicly repeated length p ZC sequence,
where
p is a prime number,
p is larger than K/3,
a largest prime number that is smaller than K is greater than p, and
p is smaller than the largest prime number that is smaller than K.

2. The method of claim 1, wherein the reference signal is obtained from the length K sequence by:
applying, by the apparatus, pre-coding to the length K sequence to produce a pre-coded sequence;
generating, by the apparatus, a first pulse shaped frequency domain sequence by applying a first frequency domain spectral shaping to the pre-coded sequence.

3. The method of claim 2, wherein the first frequency domain spectral shaping is a preconfigured FDSS pulse shape or an FDSS pulse shape indicated in a second signalling from the network device.

4. The method of claim 2, wherein the first pulse shaped frequency domain sequence is generated by applying a raised cosine pulse raised to a power of $\beta \geq 0.5$, or $\beta = 0.8$.

5. The method of claim 2 wherein applying pre-coding to the length K sequence to produce a pre-coded sequence comprises:
multiplying the length K sequence by an orthogonal cover code.

6. The method of claim 5 wherein the reference signal is obtained from the length K sequence by:
producing a mapped sequence by mapping the first pulse shaped frequency domain sequence to a first subset of a set of subcarriers.

7. The method of claim 6 wherein the orthogonal cover code is one of a set of orthogonal cover codes associated with the first subset of the set of subcarriers.

8. The method of claim 1 further comprising:
performing data signal generation comprising applying second frequency domain spectral shaping to produce a second pulse shaped frequency domain sequence.

9. The method of claim 8 wherein:
applying first frequency domain spectral shaping comprises applying a first pulse shape;
applying second frequency domain spectral shaping also comprises applying the first pulse shape or a second pulse shape that is different from the first pulse shape.

10. The method of claim 1, wherein
K/3<p<L<K,
where L is the largest prime number that is smaller than K.

11. The method of claim 1, wherein p is a smallest prime number larger than K/3.

12. A method comprising:
transmitting, by a network device to an apparatus, a first signaling indicating a length K sequence;
receiving, by the network device from the apparatus a reference signal;
wherein the reference signal is obtained from the length K sequence, and the length K sequence is obtained by a cyclicly repeated length p ZC sequence,
where
p is a prime number,
p is larger than K/3,
a largest prime number that is smaller than K is greater than p, and
p is smaller than the largest prime number that is smaller than K.

13. The method of claim 12, wherein the reference signal is based on a first frequency domain spectral shaping performed by the apparatus using a first frequency domain spectral shaping pulse shape unknown to the network device, the method further comprising:
performing channel estimation to produce a channel estimate that includes the effect of the first frequency domain pulse shape.

14. The method of claim 12, further comprising:
transmitting signalling to indicate a first frequency domain spectral shaping pulse shape to be used by the apparatus to generate the reference signal;
wherein the reference signal is based on a first frequency domain spectral shaping performed by the apparatus using the first frequency domain pulse shape known to the network device.

15. An apparatus comprising:
a processor and memory, the apparatus configured to:
receive, by the apparatus from a network device, a first signaling indicating a length K sequence;
transmit, by the apparatus to the network device a reference signal;
wherein the reference signal is obtained from the length K sequence, and the length K sequence is obtained by a cyclicly repeated length p ZC sequence,
where
p is a prime number,
p is larger than K/3,
a largest prime number that is smaller than K is greater than p, and
p is smaller than the largest prime number that is smaller than K.

16. The apparatus of claim 15, wherein the apparatus is configured to obtain the reference signal from the length K sequence by:
applying, by the apparatus, pre-coding to the length K sequence to produce a pre-coded sequence;
generating, by the apparatus, a first pulse shaped frequency domain sequence by applying a first frequency domain spectral shaping to the pre-coded sequence.

17. The apparatus of claim 16, wherein the first frequency domain spectral shaping is a preconfigured FDSS pulse shape or an FDSS pulse shape indicated in a second signalling from the network device.

18. The apparatus of claim 16, wherein the apparatus is configured to apply pre-coding to the length K sequence to produce a pre-coded sequence by:
multiplying the length K sequence by an orthogonal cover code.

19. The apparatus of claim 15 further configured to:
perform data signal generation comprising applying second frequency domain spectral shaping to produce a second pulse shaped frequency domain sequence.

20. The apparatus of claim 19 configured to apply the first frequency domain spectral shaping by applying a first pulse shape and to apply the second frequency domain spectral shaping by applying the first pulse shape or a second pulse shape different from the first pulse shape.

21. A network device comprising:
a processor and memory, the network device configured to:
transmit, by a network device to an apparatus, a first signaling indicating a length K sequence;
receive, by the network device from the apparatus a reference signal;
wherein the reference signal is obtained from the length K sequence, and the length K sequence is obtained by a cyclicly repeated length p ZC sequence,
where
p is a prime number,
p is larger than K/3,
a largest prime number that is smaller than K is greater than p, and
p is smaller than the largest prime number that is smaller than K.

22. The network device of claim 21, wherein the reference signal is based on a first frequency domain spectral shaping performed by the apparatus using a first frequency domain spectral shaping pulse shape unknown to the network device, the network device further configured to:
perform channel estimation to produce a channel estimate that includes the effect of the first frequency domain pulse shape.

* * * * *

UNITED STATES PATENT AND TRADEMARK OFFICE
CERTIFICATE OF CORRECTION

PATENT NO. : 12,218,871 B2
APPLICATION NO. : 18/324239
DATED : February 4, 2025
INVENTOR(S) : Nuwan Suresh Ferdinand et al.

It is certified that error appears in the above-identified patent and that said Letters Patent is hereby corrected as shown below:

In the Claims

At Column 22, Line 32, Claim 1:
"p is larger than K/3"
Should be:
-- p is larger than 2K/3 --

At Column 23, Line 8, Claim 10:
"K/3<p<L<K"
Should be:
-- 2K/3<p<L<K --

At Column 23, Line 11, Claim 11:
"number larger than K/3"
Should be:
-- number larger than 2K/3 --

At Column 23, Line 22, Claim 12:
"p is larger than K/3"
Should be:
-- p is larger than 2K/3 --

At Column 23, Line 54, Claim 15:
"p is larger than K/3"
Should be:
-- p is larger than 2K/3 --

Signed and Sealed this
Twenty-second Day of July, 2025

Coke Morgan Stewart
*Acting Director of the United States Patent and Trademark Office*

CERTIFICATE OF CORRECTION (continued)
U.S. Pat. No. 12,218,871 B2

At Column 24, Line 43, Claim 21:
"p is larger than K/3"
Should be:
-- p is larger than 2K/3 --